(12) United States Patent
Gillen et al.

(10) Patent No.: US 9,905,100 B2
(45) Date of Patent: Feb. 27, 2018

(54) REMOTE INITIATION OF INTERACTION BY A COMPUTING ENTITY

(71) Applicant: United Parcel Service of America, Inc., Atlanta, GA (US)

(72) Inventors: Robert J. Gillen, Atlanta, GA (US); Lee White, Atlanta, GA (US); Mark Coffey, Atlanta, GA (US); Larry Fagan, Atlanta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

(21) Appl. No.: 15/349,266

(22) Filed: Nov. 11, 2016

(65) Prior Publication Data
US 2017/0323545 A1 Nov. 9, 2017

Related U.S. Application Data

(63) Continuation of application No. 15/349,189, filed on Nov. 11, 2016.
(Continued)

(51) Int. Cl.
*G08B 13/24* (2006.01)
*G08B 13/196* (2006.01)
(Continued)

(52) U.S. Cl.
CPC ........... *G08B 13/24* (2013.01); *G06Q 10/083* (2013.01); *G08B 13/19656* (2013.01); *H04N 7/183* (2013.01)

(58) Field of Classification Search
CPC .. G08B 13/19656; G08B 13/24; G06Q 10/02; G06Q 10/08; G06Q 10/083;
(Continued)

(56) References Cited

U.S. PATENT DOCUMENTS 5,841,365 A * 11/1998 Rimkus ................ G06K 7/0008
340/10.31
7,511,617 B2    3/2009 Burman et al.
(Continued)

OTHER PUBLICATIONS

WWW.uCella.com, Internet Archive appears Dec. 1, 2015 thru Jul. 10, 2017, Aug. 3, 2017, https://web.archive.org/web/20151210084514/http://www.ucella.com:80/.
(Continued)

*Primary Examiner* — Orlando Bousono
(74) *Attorney, Agent, or Firm* — Alston & Bird LLP

(57) ABSTRACT

Methods, apparatuses, systems, and computer program products for interactive deliveries are provided. For an upcoming service point that is associated with a service point device, it is determined whether the item to be delivered to the service point is within an activation zone for activating the service point device. Responsive to determining that the item is within the activation zone, the service point device is remotely activated. Remotely activating the service point device triggers dynamical provision of an alert interface. An indication of user interaction via the user interface indicating availability of the user to receive the item is received. A notification of the indication of the user interaction is provided. If the notification indicates that the individual is available to receive the item at the service point, the item is delivered to or picked-up from the service point.

24 Claims, 14 Drawing Sheets

Related U.S. Application Data

(60) Provisional application No. 62/331,533, filed on May 4, 2016.

(51) Int. Cl.
*G06Q 10/08* (2012.01)
*H04N 7/18* (2006.01)

(58) Field of Classification Search
CPC ............ G06Q 10/087; G06Q 30/0207; G06Q 30/0601; H04W 4/02; H04N 21/4788; G06K 7/0008; G06K 17/00; G06K 2017/0045
See application file for complete search history.

(56) References Cited

U.S. PATENT DOCUMENTS

| | | | | |
|---|---|---|---|---|
| 7,536,188 B1* | 5/2009 | Fegan | ............ | G01S 5/0289 340/10.1 |
| 7,624,024 B2 | 11/2009 | Levis et al. | | |
| 8,108,321 B2 | 1/2012 | Neal et al. | | |
| 2003/0216969 A1* | 11/2003 | Bauer | ............ | G06K 7/0008 705/22 |
| 2003/0222762 A1* | 12/2003 | Beigl | ............ | G06K 7/10336 340/5.92 |
| 2005/0099298 A1* | 5/2005 | Mercer | ............ | G06K 7/0008 340/572.1 |
| 2006/0015408 A1* | 1/2006 | Brown | ............ | G06Q 10/087 705/22 |
| 2006/0033609 A1* | 2/2006 | Bridgelall | ............ | G01S 13/876 340/10.42 |
| 2006/0214792 A1* | 9/2006 | Goyal | ............ | G06K 17/00 340/572.1 |
| 2006/0250248 A1* | 11/2006 | Tu | ............ | G06Q 10/06 340/572.4 |
| 2006/0282340 A1* | 12/2006 | Morand | ............ | G06Q 10/087 705/28 |
| 2007/0013526 A1* | 1/2007 | Kazdin | ............ | G08B 21/0261 340/573.4 |
| 2007/0057774 A1* | 3/2007 | Kawamata | ............ | G06K 7/0008 340/10.51 |
| 2007/0239569 A1* | 10/2007 | Lucas | ............ | G06Q 10/08 705/28 |
| 2007/0268138 A1* | 11/2007 | Chung | ............ | G01S 5/0018 340/572.1 |
| 2007/0296581 A1* | 12/2007 | Schnee | ............ | G06Q 10/08 340/572.1 |
| 2008/0052205 A1* | 2/2008 | Dolley | ............ | G06Q 10/06 705/28 |
| 2008/0068174 A1* | 3/2008 | Al-Mandawi | ............ | H04B 5/0062 340/572.7 |
| 2008/0106377 A1* | 5/2008 | Flores | ............ | G06Q 10/087 340/5.92 |
| 2008/0231420 A1* | 9/2008 | Koyama | ............ | G01S 5/14 340/10.1 |
| 2008/0284600 A1* | 11/2008 | Drzaic | ............ | A62B 99/00 340/572.1 |
| 2009/0128360 A1* | 5/2009 | Bianchi | ............ | G01S 5/02 340/8.1 |
| 2009/0146782 A1* | 6/2009 | Cordes | ............ | G06Q 10/08 340/10.1 |
| 2009/0146832 A1* | 6/2009 | Ebert | ............ | G06K 17/00 340/8.1 |
| 2009/0189743 A1* | 7/2009 | Abraham | ............ | G06Q 10/00 340/10.42 |
| 2009/0195360 A1* | 8/2009 | Jeon | ............ | H04B 5/0062 340/10.1 |
| 2009/0201166 A1* | 8/2009 | Itagaki | ............ | G01S 13/751 340/686.1 |
| 2009/0201896 A1* | 8/2009 | Davis | ............ | H04W 84/18 370/338 |
| 2009/0224891 A1* | 9/2009 | Vishik | ............ | G06Q 10/087 340/10.41 |
| 2009/0316951 A1* | 12/2009 | Soderstrom | ............ | G06F 17/30241 382/103 |
| 2009/0319078 A1 | 12/2009 | Jackson | | |
| 2009/0322510 A1* | 12/2009 | Berger | ............ | G06Q 10/08 340/539.1 |
| 2010/0060455 A1* | 3/2010 | Frabasile | ............ | G08B 13/2462 340/572.4 |
| 2011/0016488 A1* | 1/2011 | Athias | ............ | H04N 7/173 725/53 |
| 2011/0050397 A1* | 3/2011 | Cova | ............ | G06Q 10/08 340/10.1 |
| 2011/0119706 A1* | 5/2011 | Scott | ............ | H04N 21/4668 725/39 |
| 2011/0143727 A1* | 6/2011 | Angelhag | ............ | H04L 67/18 455/414.1 |
| 2013/0304349 A1 | 11/2013 | Davidson | | |
| 2015/0081587 A1 | 3/2015 | Gillen | | |
| 2015/0142691 A1 | 5/2015 | Gillen et al. | | |
| 2016/0316322 A1 | 10/2016 | Gillen | | |
| 2017/0169415 A1* | 6/2017 | Daniyalzade | ........ | G06Q 20/204 |
| 2017/0262798 A1 | 9/2017 | Kosseifi et al. | | |

OTHER PUBLICATIONS

ISA/206—Invitation to Pay Additional Fees Mailed on Jul. 6, 2017 for WO Application No. PCT/US17/028561.

ISA/220—Notification of Transmittal or Search Report and Written Opinion of the ISA, or the Declaration dated Aug. 30, 2017 for WO Application No. PCT/US17/028561.

* cited by examiner

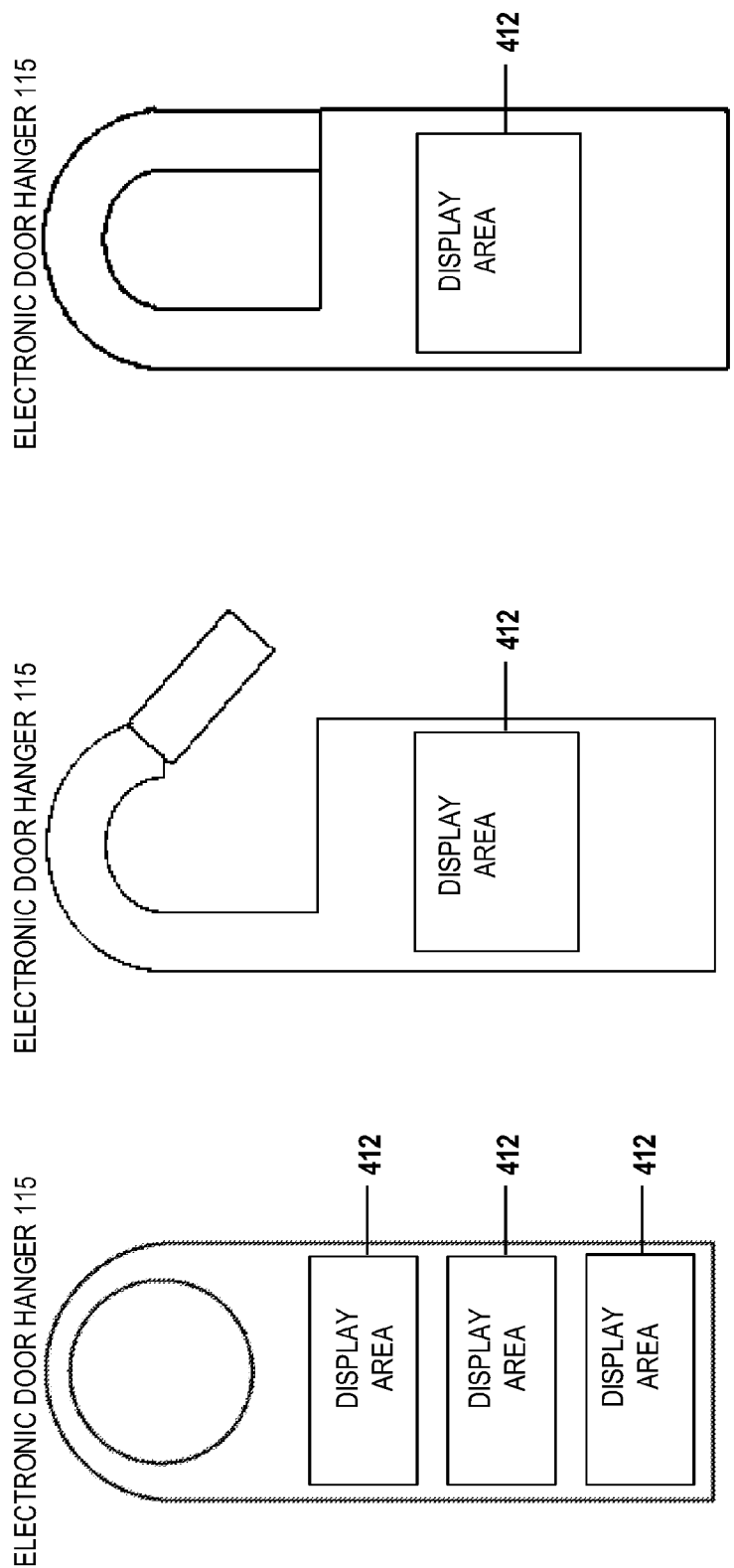

REMOTE INITIATION OF INTERACTION BY A COMPUTING ENTITY

CROSS-REFERENCE TO RELATED APPLICATIONS

This application is a continuation of U.S. application Ser. No. 15/349,189, filed Nov. 11, 2016 and claims priority to U.S. Provisional Application No. 62/331,533 filed May 4, 2016, the contents of which are incorporated herein in their entirety by reference.

BACKGROUND

If item information corresponding to an item to be delivered by a carrier/transporter requires a signature for delivery to be authorized and/or that the item be delivered to an individual in person, the carrier/transporter may make multiple failed attempts to deliver the item. The time required for a delivery vehicle driver to park a delivery vehicle, retrieve the item from the delivery vehicle, walk to the service point from the delivery vehicle, and wait for an individual to answer the door during a failed delivery attempt is time that the delivery vehicle driver has wasted. Thus, failed delivery attempts reduce the efficiency of conducting a dispatch plan.

Additionally, with the increasing demand of customer-focused pick-ups and deliveries of items, new technologies are needed for communicating relevant information to customers in a timely and easy to use manner.

BRIEF SUMMARY

Example embodiments provide methods, systems, apparatuses, computer program products for increasing the interactivity of delivering an item to or picking an item up from a service point. In example embodiments, a service point device located at the service point may be remotely activated as a delivery vehicle approaches the service point. An individual may then provide an indication of whether or not he/she is available to receive the item at the service point before the delivery vehicle stops in the vicinity of the service point and/or before the item is removed from the delivery vehicle to attempt the delivery of the item. In example embodiments, if an individual is not available to receive the item at the service point, the individual may provide an electronic signature in real- or near real-time and thereby provide authorization for the item to be delivered to the service point. In example embodiments, if an individual is not available at the service point to receive the item, an electronic information notice may be provided, for example, through the service point device. In some example embodiments, the service point device may be used to monitor an item left at a service point to ensure that the item is not removed from the service point by an unauthorized individual.

According to one aspect of the present invention, a method is provided. In an example embodiment, the method comprises, for an upcoming service point (a) at which an item is to be delivered or picked-up and (b) that is associated with a service point device located at the service point, determining whether the delivery vehicle is within an activation zone for activating the service point device. Responsive to determining that the delivery vehicle is within an activation zone for activating the service point device, the service point device is remotely activated. Remotely activating the service point device causes the service point device to dynamically provide an alert interface for user interaction with a user. The method further comprises receiving an indication of user interaction via the user interface indicating availability of the user to receive or provide the item at the service point; and providing a notification of the indication of the user interaction. If the notification indicates that the individual is available to receive or provide the item at the service point, the item is delivered to or picked-up from the service point.

According to another aspect of the present invention, an apparatus is provided. In an example embodiment, the apparatus comprises at least one processor and at least one memory storing computer program code. The at least one memory and the computer program code may be configured to, with the processor, cause the apparatus to at least, for an upcoming service point (a) at which an item is to be delivered or picked-up and (b) that is associated with a service point device located at the service point, determine whether the delivery vehicle servicing the service point is within an activation zone for activating the service point device. Responsive to determining that the delivery vehicle servicing the service point is within an activation zone for activating the service point device, the service point device is remotely activated. Remotely activating the service point device causes the service point device to dynamically provide an alert interface for user interaction with a user. The at least one memory and the computer program code may be further configured to, with the processor, cause the apparatus to at least receive an indication of user interaction via the user interface indicating availability of the user to receive or provide the item at the service point; and provide a notification of the indication of the user interaction. If the notification indicates that the individual is available to receive or provide the item at the service point, the item is delivered to or picked-up from the service point.

According to yet another aspect of the present invention, a computer program product is provided. In example embodiments, the computer program product comprises at least one non-transitory computer-readable storage medium having computer-executable program code instructions stored therein. The computer-executable program code instructions comprise program code instructions configured to for an upcoming service point (a) at which an item is to be delivered or picked-up and (b) that is associated with service point device located at the service point, determine whether the delivery truck servicing the service point is within an activation zone for activating the service point device. Responsive to determining that the delivery truck servicing the service point is within an activation zone for activating the service point device, the service point device is remotely activated. Remotely activating the service point device causes the service point device to dynamically provide an alert interface for user interaction with a user. The computer-executable program code instructions further comprise program code instructions configured to receive an indication of user interaction via the user interface indicating availability of the user to receive or provide the item at the service point; and provide a notification of the indication of the user interaction. If the notification indicates that the individual is available to receive or provide the item at the service point, the item is delivered to or picked-up from the service point.

In still another aspect of the present invention, a method is provided. In an example embodiment, the method comprises establishing a communication, by a service point device using a short range or long range communication technology, between an item allocated at a service point and the service point device. The service point device is located at the service point and is configured to communicate both through the short range or long range communication technology and through an Internet protocol network. There are a series of scheduled communications between the item and the service point device. The method further comprises receiving, by the service point device, a communication of the series of scheduled communications provided by the item; and determining, by the service point device, whether a characteristic of the received communication is in accordance with an expected characteristic of the communication. The determination of whether the characteristic of the received communication is in accordance with the expected characteristic of the communication is based at least in part on at least one previously received communication. The method further comprises, in response to determining that the characteristic of the received communication is not in accordance with the expected characteristic, determining that the item has been moved.

In another aspect of the present invention, an apparatus is provided. In example embodiments, the apparatus comprises at least one processor and at least one memory storing computer program code. The apparatus is located at a service point and is configured to communicate both through (a) the short range or long range communication protocol and (b) through an Internet protocol network. For example, the apparatus is a service point device. The at least one memory and the computer program code are configured to, with the processor, cause the apparatus to at least establish a communication using the short range or long range communication technology, between an item located at the service point and the apparatus. There are a series of scheduled communications between the item and the apparatus. The at least one memory and the computer program code are further configured to, with the processor, cause the apparatus to at least receive a communication of the series of scheduled communications provided by the item; and determine whether a characteristic of the received communication is in accordance with an expected characteristic of the communication. The determination of whether the characteristic of the received communication is in accordance with the expected characteristic is based at least in part on at least one previously received communication. The at least one memory and the computer program code are further configured to, with the processor, cause the apparatus to at least, in response to determining that the characteristic of the received communication is not in accordance with the expected characteristic, determine that the item has been moved.

According to yet another aspect of the present invention, a computer program product is provided. In an example embodiment, the computer program product comprises at least one non-transitory computer-readable storage medium having computer-executable program code instructions stored therein. The computer-executable program code instructions comprise program code instructions configured to establish a communication, by a service point device using a short range or long range communication technology, between an item located at a service point and the service point device. The service point device is located at the service point and is configured to communicate both through the short range or long range communication technology and through an Internet protocol network. There are a series of scheduled communications between the item and the service point device. The program code instructions are further configured to receive, by the service point device, a communication of the series of scheduled communications provided by the item; and determine, by the service point device, whether a characteristic of the received communication is in accordance with an expected characteristic of the communication. The determination of whether the characteristic of the received communication is in accordance with the expected characteristic is based at least in part on at least one previously received communication. The program code instructions are further configured to, in response to determining that the characteristic of the received communication is not in accordance with the expected characteristic, determining that the item has been moved.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIGS. 4A, 4B, 4C, 4D, 4E, 4F, and 4G are electronic door hangers according to one embodiment of the present invention.

Figure 5:
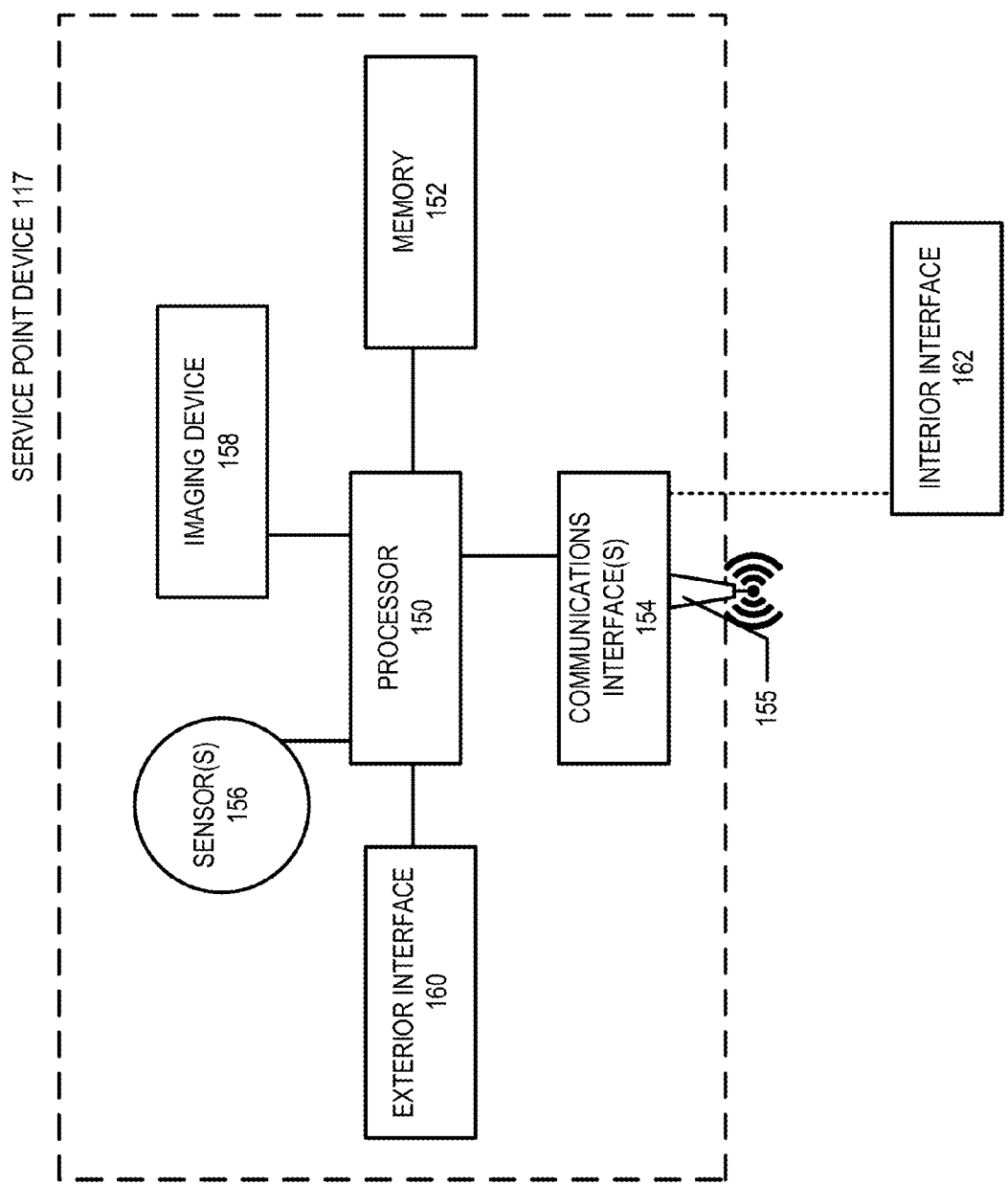

FIG. 5 is an exemplary schematic diagram of service point device according to one embodiment of the present invention.

Figure 6:
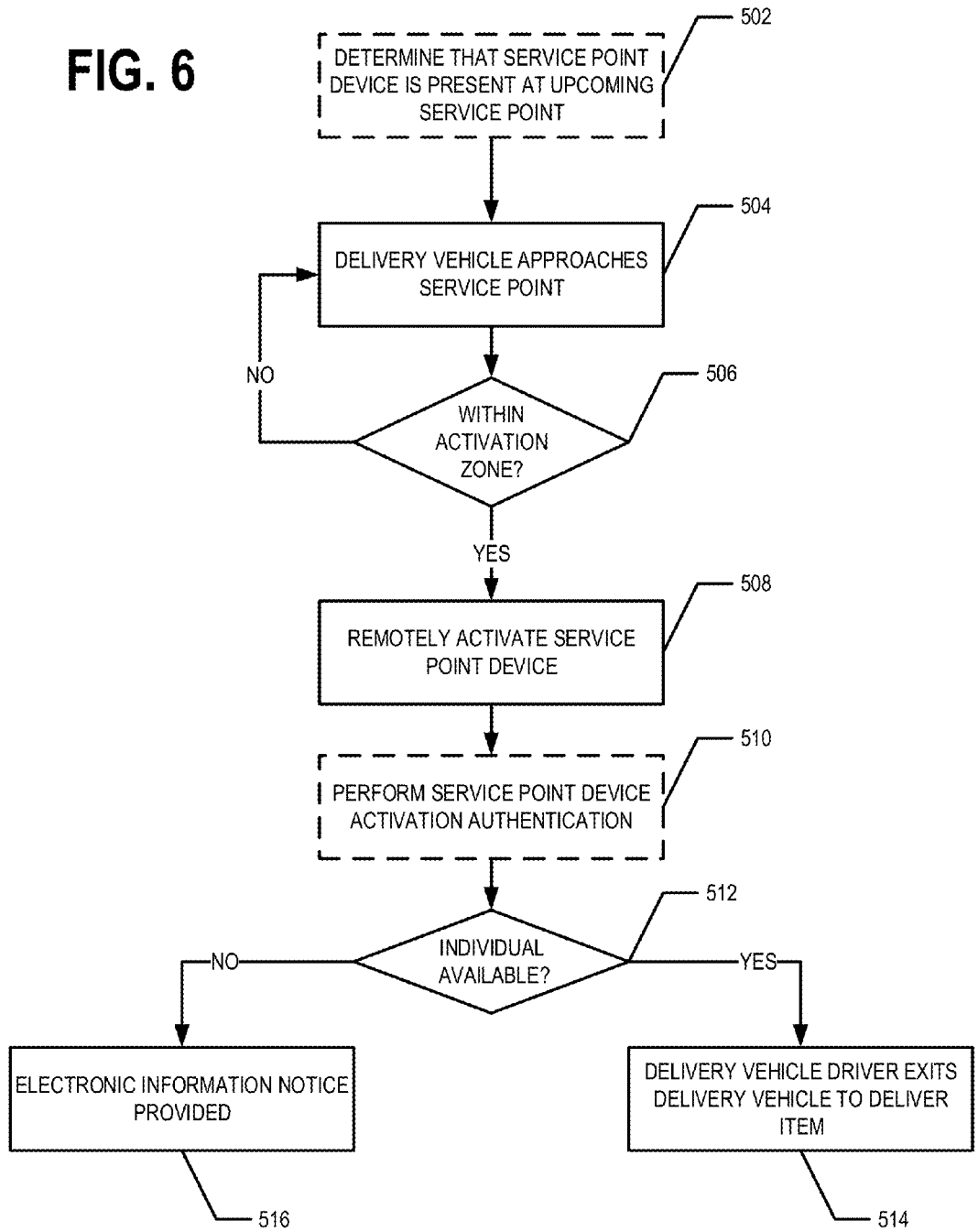

FIG. 6 is a flowchart illustrating example processes and procedures for delivering an item using a remote service point device activation in accordance with an example embodiment of the present invention.

Figure 7:
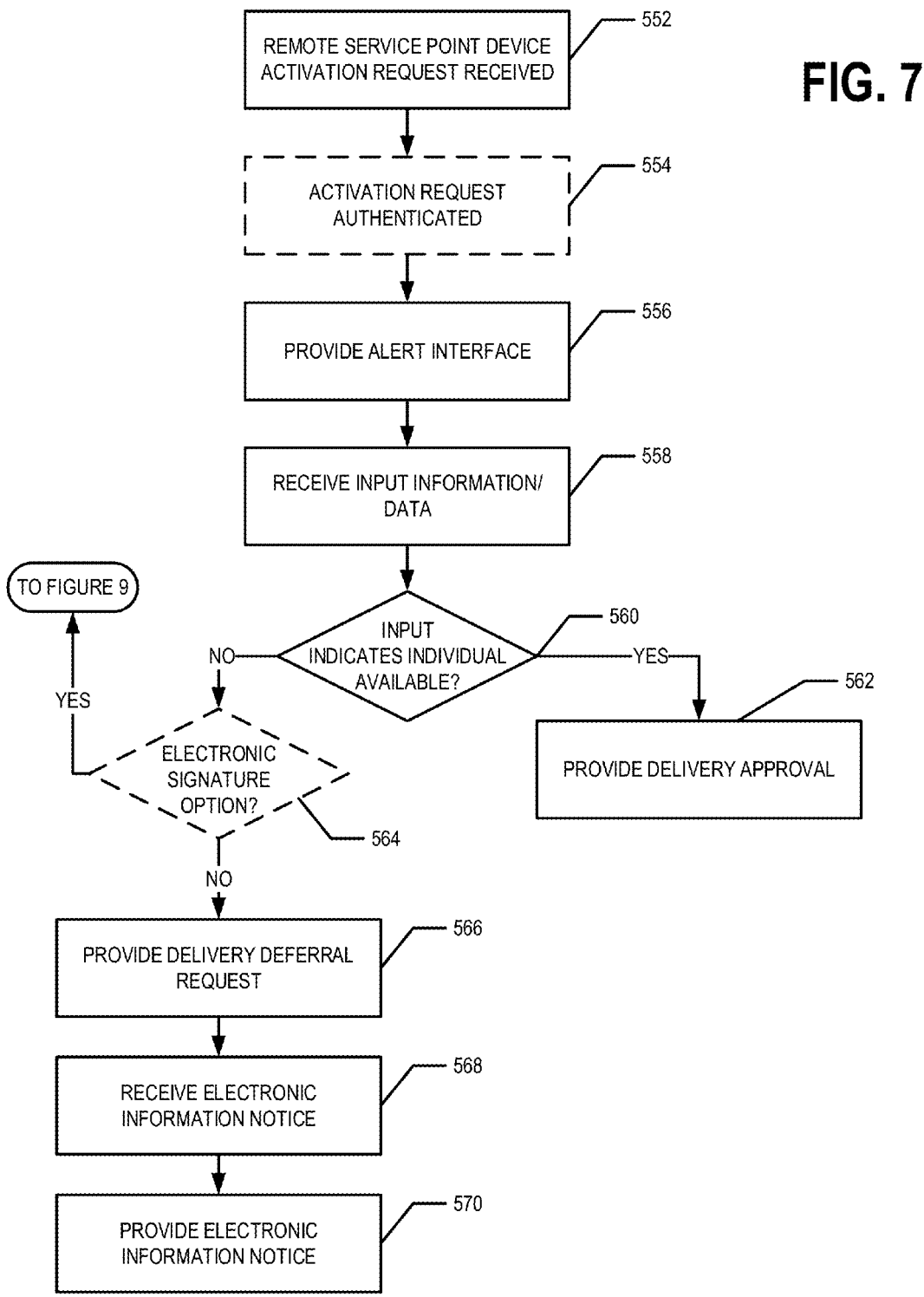

FIG. 7 is a flowchart illustrating processes and procedures that may be completed, for example by a service point device, in accordance with an example embodiment of the present invention.

Figure 8:
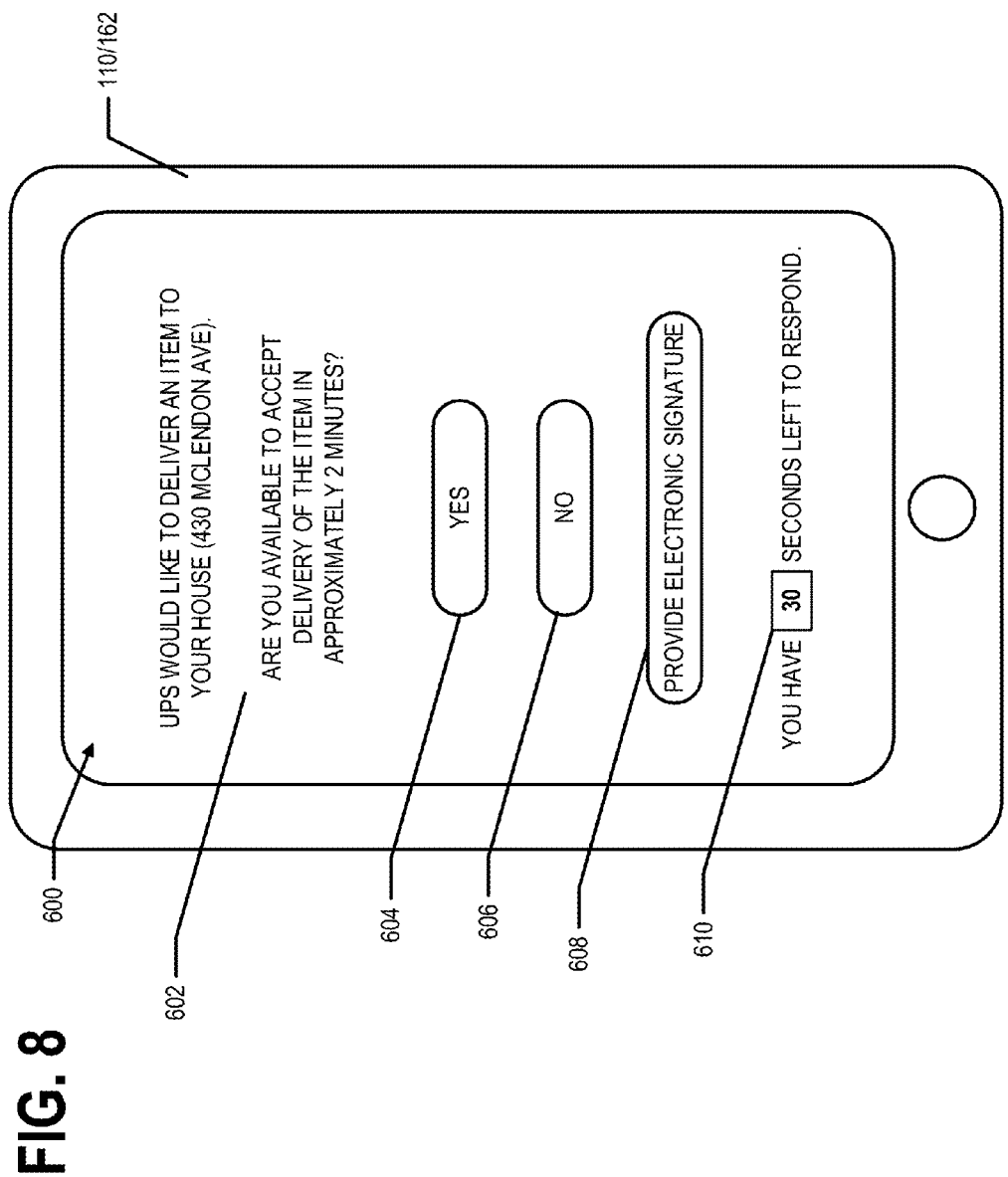

FIG. 8 illustrates an example alert interface, in accordance with an example embodiment of the present invention.

Figure 9:
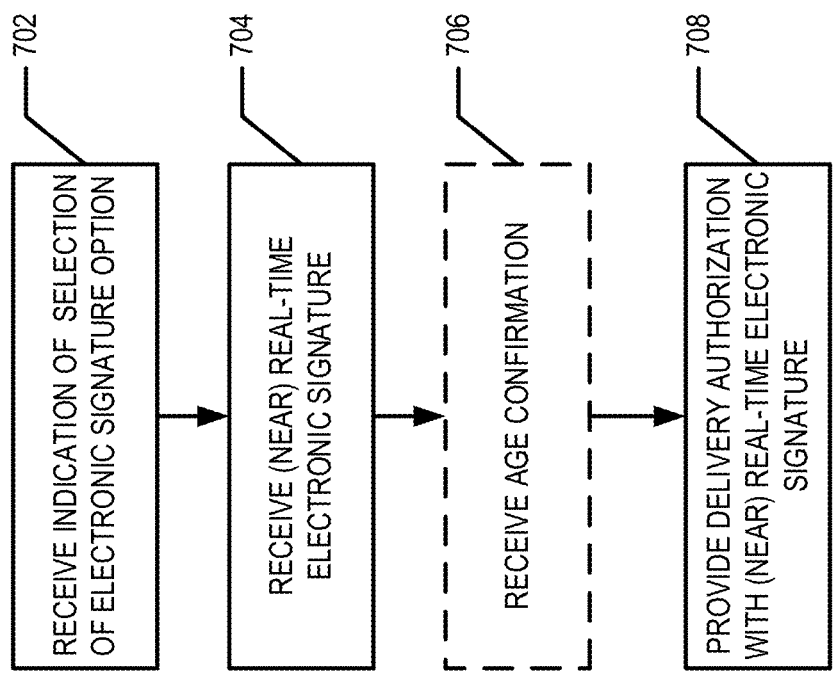

FIG. 9 is a flowchart illustrating processes and procedures for authorizing a delivery using a remote (near) real-time electronic signature, in accordance with an example embodiment of the present invention.

Figure 10:
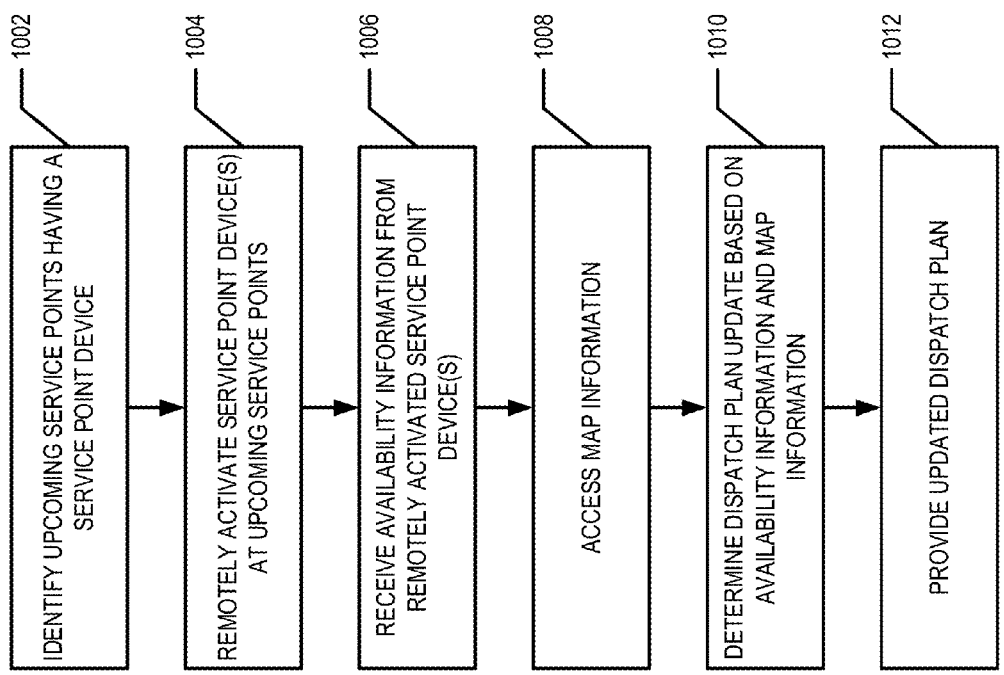

FIG. 10 is a flowchart illustrating processes and procedures for dynamically updating a dispatch plan based on remote activation of one or more service point devices, in accordance with an example embodiment of the present invention.

Figure 11:
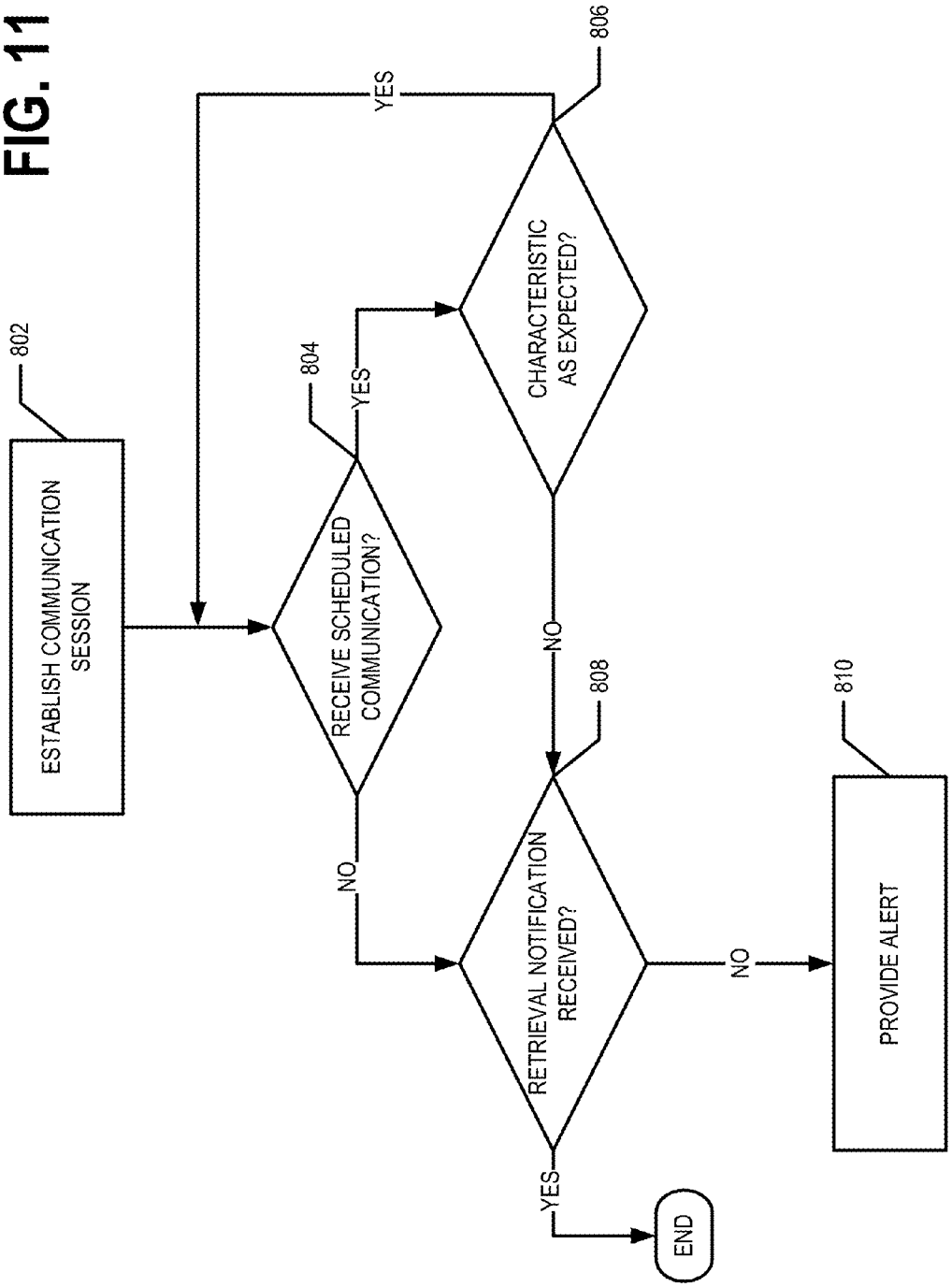

FIG. 11 is a flowchart illustrating processes and procedures for monitoring an item using a service point device in accordance with an example embodiment of the present invention.

Figure 12:
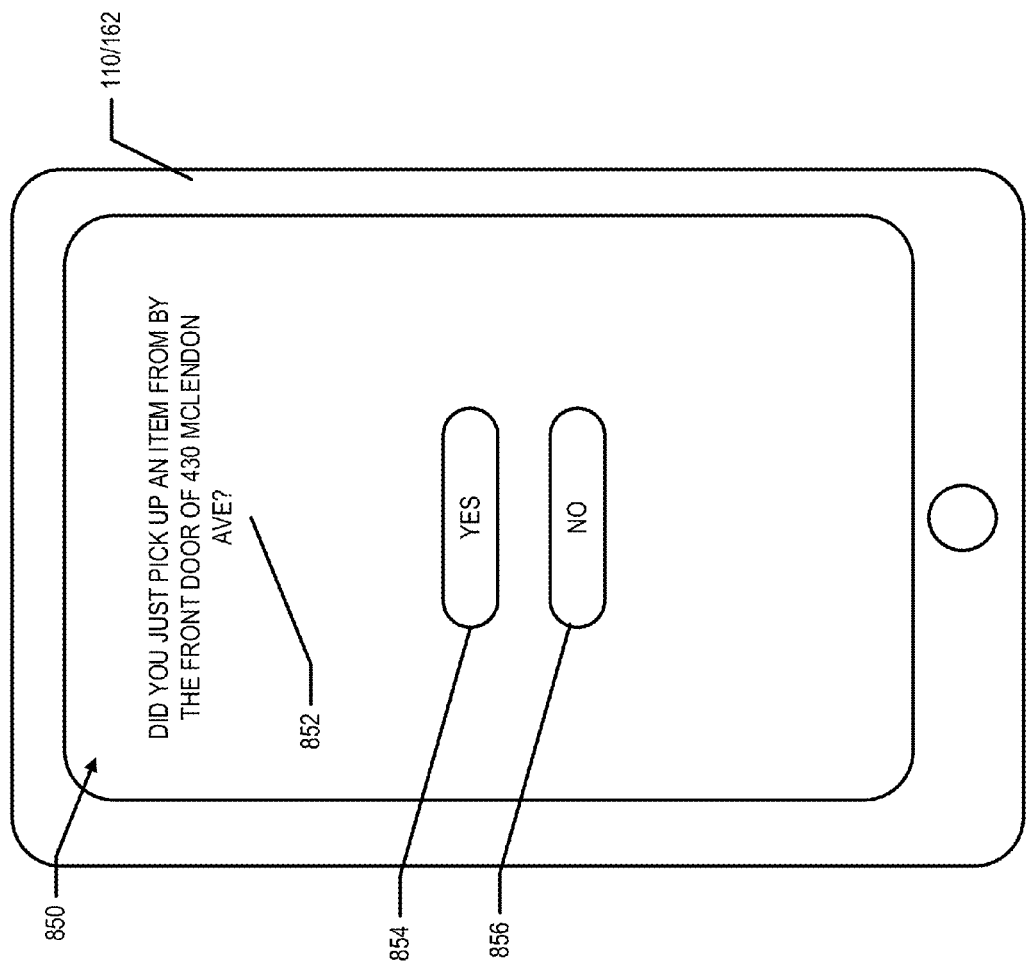

FIG. 12 illustrates an example retrieval interface, in accordance with an example embodiment of the present invention.

DETAILED DESCRIPTION OF EXAMPLE EMBODIMENTS

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. GENERAL OVERVIEW

Example embodiments of the present invention provide for determining whether an individual is available to receive an item at a service point before a delivery vehicle stops at the service point, before a driver of the delivery vehicle exits the delivery vehicle to make the delivery, and/or before the item is removed from the delivery vehicle to be delivered to the service point. Similarly, example embodiments of the present invention provide for determining whether an individual is available to provide an item for pick up at a service point before the delivery vehicle stops at the service point to pick up the item, whether an item has been placed at an accessible location at a service point before the delivery vehicle stops at the service point to pick up the item, and/or before a driver of the delivery vehicle exits the delivery vehicle to make the pick-up. In example embodiments, a service point may be a delivery location, pick up location, and/or the like.

In some example embodiments, it may be determined, as a delivery vehicle is approaching an upcoming service point, that a service point device is located at the service point. In some example embodiments, the service point device is an electronic doorbell (e.g., a "smart" doorbell). In another example embodiment, the service point device may be an Amazon Echo or other smart device. For example, a service point device may be affixed to a building or within a building located at/in the vicinity of the service point. When the delivery vehicle is within an activation zone (e.g., configurable distance and/or expected time window), the service point device may be remotely activated to determine if an individual is available to receive the item at the service point (or to provide the item for pick up). If user input/interaction is received indicating that an individual is available to receive the item at the service point (or to provide the item for pick up), the delivery (or pick up) is made (e.g., attempted) at the service point. If an individual is not available to receive the item at the service point, the individual may be given the option of providing an electronic signature to authorize delivery of the item to the service point. If a user input/interaction is received indicating that a user is not available to receive the item at the service point (e.g., an individual indicates that he/she is not available or no user input/interaction is received), the attempt to deliver the item to (or to pick up the item from) the service point may be deferred. While, the example of an electronic doorbell is used herein, a service point device may comprise a variety of communication-enabled electronic devices such as, but not limited to an electronic doorbell, beacon, storage locker, electronic mailbox, Internet of things enabled device, and/or the like.

In example embodiments, the driver may not exit the delivery vehicle and/or may not remove the item from the delivery vehicle until receiving an indication that the individual is available to receive the item at the service point, the electronic signature is received, an indication that the individual is available to provide the item for pick up at the service point, and/or that the item has been placed at an accessible location at the service point (e.g., at the back door, on the front porch, in the garage, in an electronically lockable locker, and/or the like). If the item is not delivered to the service point (e.g., an indication that the user is not available to receive the item at the service point and an electronic signature is not provided) an electronic information notice may be provided. For example, the electronic information notice may be provided to the service point device.

In some example embodiments, if an item is delivered to the service point without being tendered to an individual, a communication session may be established between a service point device (e.g., an electronic doorbell, electronic locker or mailbox, and/or the like) and the item, such that the service point device may monitor the location of the item until the item is retrieved by an authorized individual (e.g., the consignee and/or an agent thereof). When the authorized individual retrieves the item from the service point, the authorized individual may terminate the communication session. If the communication session is interrupted (e.g., the item is moved from the service point by an unauthorized individual), an alert may be provided.

Example embodiments are directed to communicating with a service point device to efficiently and securely deliver an item to a service point or pick up an item from a service point having a service point device located there at. For example, various embodiments address the technical problem of communicating with a service point device. For example, various embodiments address the technical problem of communicating remotely (e.g., from a yard, several yards, a mile, several miles, and/or the like distance away from the service point) with a service point device, for example, to facilitate efficient and secure delivery of an item to or pick up of an item from the service point associated with the service point device.

Various example embodiments will be described in more detail below. While example embodiments described herein discuss scenarios where an item is being delivered by a carrier/transporter to a service point, it should be understood that example embodiments of the present invention are also applicable to scenarios where an item is being picked up by a carrier/transporter from a service point.

II. COMPUTER PROGRAM PRODUCTS, METHODS, AND COMPUTING ENTITIES

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

III. EXEMPLARY SYSTEM ARCHITECTURE

Figure 1:
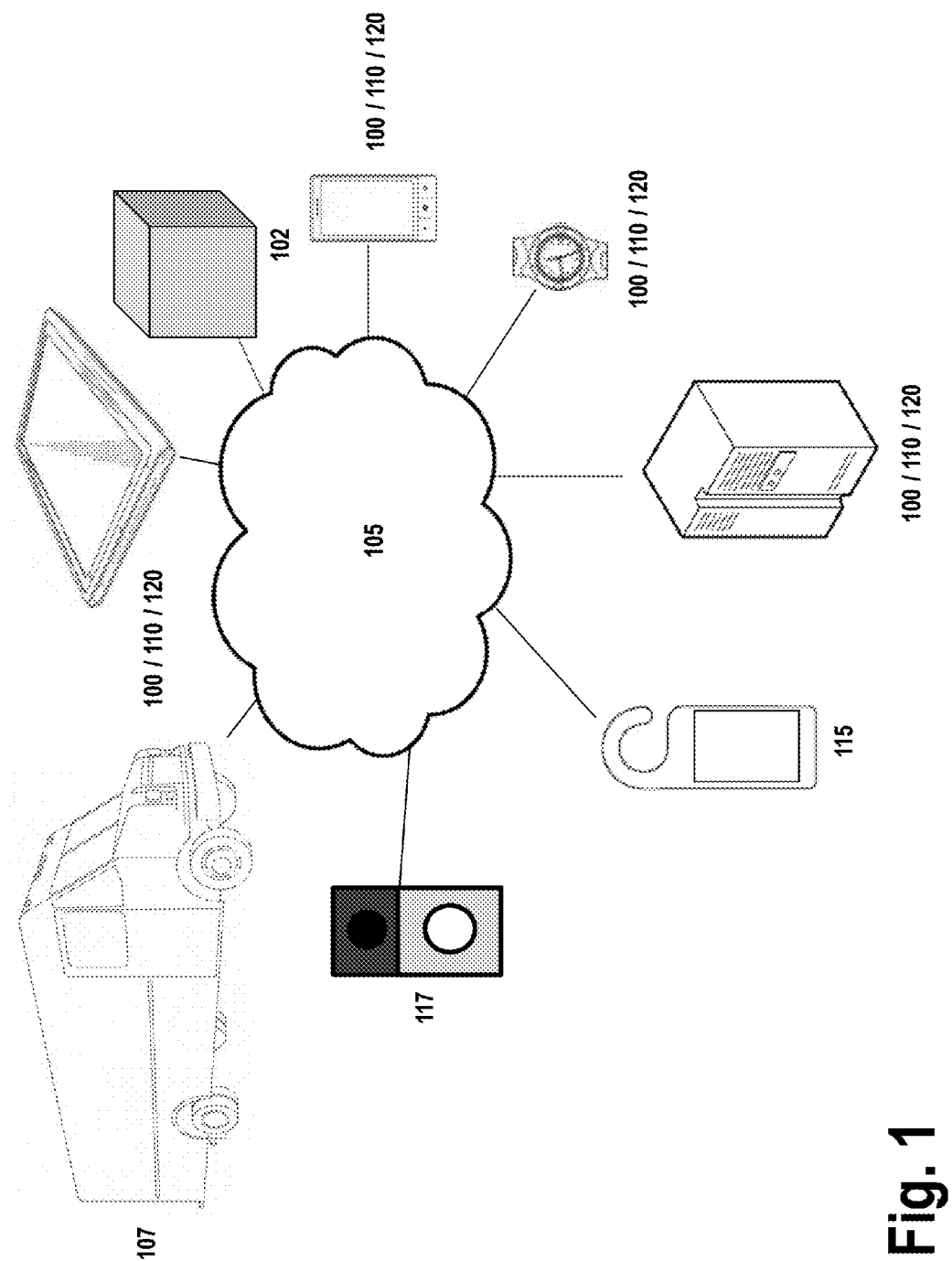
FIG. 1 is an overview of a system that can be used to practice embodiments of the present invention.

FIG. 1 provides an illustration of an exemplary embodiment of the present invention. As shown in FIG. 1, this particular embodiment may include one or more carrier/transporter computing entities 100, one or more items 102, one or more networks 105, one or more vehicles 107, one or more customer computing entities 110, one or more electronic door hangers 115, one or more service point devices 117, one or more user computing entities 120, and/or the like. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

1. Exemplary Carrier/Transporter Computing Entity

Figure 2:
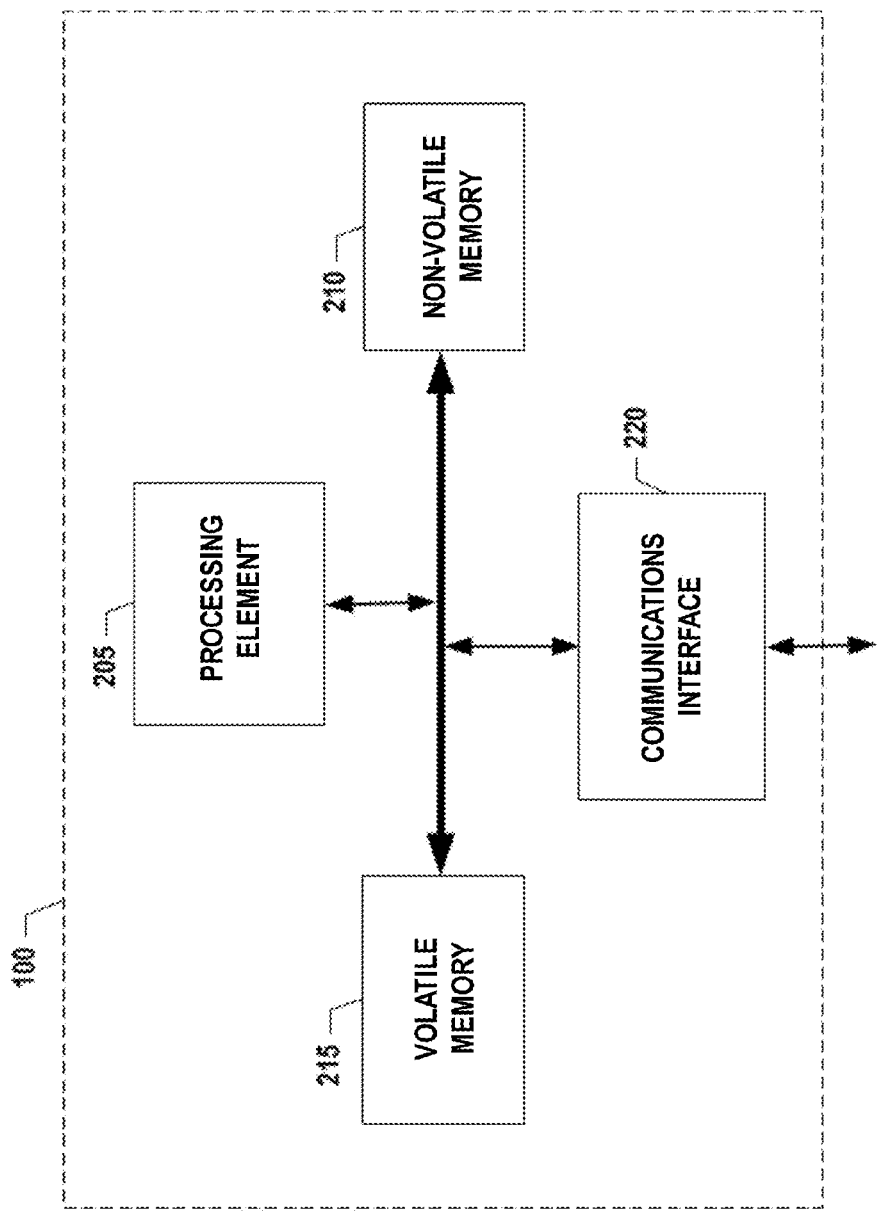
FIG. 2 is an exemplary schematic diagram of a carrier/transporter computing entity according to one embodiment of the present invention.

FIG. 2 provides a schematic of a carrier/transporter computing entity 100 according to one embodiment of the present invention. A carrier may be a traditional carrier, such as United Parcel Service (UPS), FedEx, DHL, courier services, the United States Postal Service (USPS), Canadian Post, freight companies (e.g. truck-load, less-than-truckload, rail carriers, air carriers, ocean carriers, etc.), and/or the like. However, a carrier may also be a nontraditional carrier, such as Amazon, Google, Uber, ride-sharing services, crowdsourcing services, retailers, and/or the like. In general, the terms computing entity, computer, entity, device, system, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, iBeacons, proximity beacons, key fobs, radio frequency identification (RFID) tags, ear pieces, scanners, televisions, dongles, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the carrier/transporter computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. For instance, the carrier/transporter computing entity 100 may communicate with customer computing entities 110, electronic door hangers 115, user computing entities 120, and/or the like.

As shown in FIG. 2, in one embodiment, the carrier/transporter computing entity 100 may include or be in communication with one or more processing elements 205 (also referred to as processors, processing circuitry, processing device, and/or similar terms used herein interchangeably) that communicate with other elements within the carrier/transporter computing entity 100 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the carrier/transporter computing entity 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The terms database, database instance, database management system, and/or similar terms used herein interchangeably may refer to a structured collection of records or data that is stored in a computer-readable storage medium, such as via a relational database, hierarchical database, and/or network database.

In one embodiment, the carrier/transporter computing entity 100 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMIM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the carrier/transporter computing entity 100 with the assistance of the processing element 205 and operating system.

As indicated, in one embodiment, the carrier/transporter computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOC SIS), or any other wired transmission protocol. Similarly, the carrier/transporter computing entity 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Bluetooth protocols, Wibree, Home Radio Frequency (HomeRF), Simple Wireless Abstract Protocol (SWAP), wireless universal serial bus (USB) protocols, and/or any other wireless protocol.

Although not shown, the carrier/transporter computing entity 100 may include or be in communication with one or more input elements, such as a keyboard input, a mouse input, a touch screen/display input, motion input, movement input, audio input, pointing device input, joystick input, keypad input, and/or the like. The carrier/transporter computing entity 100 may also include or be in communication with one or more output elements (not shown), such as audio output, video output, screen/display output, motion output, movement output, and/or the like. Further, an electronic door hanger 115 may have a locking/unlocking mechanism that can be activated/deactivated remotely or locally by a carrier/transporter computing entity 100, customer computing entity 110, and/or user computing entity 120.

As will be appreciated, one or more of the carrier/transporter computing entity's 100 components may be located remotely from other carrier/transporter computing entity 100 components, such as in a distributed system. Furthermore, one or more of the components may be combined and additional components performing functions described herein may be included in the carrier/transporter computing entity 100. Thus, the carrier/transporter computing entity 100 can be adapted to accommodate a variety of needs and circumstances. As will be recognized, these architectures and descriptions are provided for exemplary purposes only and are not limiting to the various embodiments.

2. Exemplary Vehicle

In various embodiments, the term vehicle 107 is used generically. For example, a carrier/transporter vehicle 107 may be a manned or an unmanned tractor, a truck, a car, a motorcycle, a moped, a Segway, a bicycle, a golf cart, a hand truck, a cart, a trailer, a tractor and trailer combination, a van, a flatbed truck, a vehicle, a drone, an airplane, a helicopter, a boat, a barge, and/or any other form of object for moving or transporting people and/or items (e.g., one or more packages, parcels, bags, containers, loads, crates, items banded together, vehicle parts, pallets, drums, the like, and/or similar words used herein interchangeably). In one embodiment, each vehicle 107 may be associated with a unique vehicle identifier (such as a vehicle ID) that uniquely identifies the vehicle 107. The unique vehicle ID (e.g., trailer ID, tractor ID, vehicle ID, and/or the like) may include characters, such as numbers, letters, symbols, and/or the like. For example, an alphanumeric vehicle ID (e.g., "AS") may be associated with each vehicle 107. In another embodiment, the unique vehicle ID may be the license plate, registration number, or other identifying information assigned to the vehicle 107. As noted above, in instances where the vehicle is a carrier vehicle, the vehicle may be a self-driving delivery vehicle or the like. Thus, for the purpose of the present disclosure, the term driver of a delivery vehicle may be used to refer to a carrier personnel who drives a delivery vehicle and/or delivers items therefrom, an autonomous system configured to deliver items (e.g., a robot configured to transport items from a vehicle to a service point such as a customer's front door or other service point), and/or the like.

Various computing entities, devices, and/or similar words used herein interchangeably can be associated with the vehicle 107, such as a data collection device or other computing entities. In general, the terms computing entity, entity, device, system, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, iBeacons, proximity beacons, key fobs, RFID tags, ear pieces, scanners, televisions, dongles, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. The data collection device may collect telematics data (including location data) and transmit/send the data to the mobile computing entity, the mapping computing entity, and/or various other computing entities via one of several communication methods.

In one embodiment, the data collection device may include, be associated with, or be in wired or wireless communication with one or more processors (various exemplary processors are described in greater detail below), one or more location-determining devices or one or more location sensors (e.g., Global Navigation Satellite System (GNSS) sensors), one or more telematics sensors, one or more real-time clocks, a J-Bus protocol architecture, one or more electronic control modules (ECM), one or more communication ports for receiving telematics data from various sensors (e.g., via a CAN-bus), one or more communication ports for transmitting/sending data, one or more RFID tags/sensors, one or more power sources, one or more data radios for communication with a variety of communication networks, one or more memory modules 410, and one or more programmable logic controllers (PLC). It should be noted that many of these components may be located in the vehicle 107 but external to the data collection device.

In one embodiment, the one or more location sensors, modules, or similar words used herein interchangeably may be one of several components in wired or wireless communication with or available to the data collection device. Moreover, the one or more location sensors may be compatible with GPS satellites, such as Low Earth Orbit (LEO) satellite systems, Department of Defense (DOD) satellite systems, the European Union Galileo positioning systems, Global Navigation Satellite systems (GLONASS), the Chinese Compass navigation systems, Indian Regional Navigational satellite systems, and/or the like. Furthermore, the one or more location sensors may be compatible with Assisted GPS (A-GPS) for quick time to first fix and jump starting the ability of the location sensors to acquire location almanac and ephemeris data, and/or be compatible with Satellite Based Augmentation System (SBAS) such as Wide Area Augmentation System (WAAS), European Geostationary Navigation Overlay Service (EGNOS), and/or MTSAT Satellite Augmentation System (MSAS), GPS Aided GEO Augmented Navigation (GAGAN) to increase GPS accuracy. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, triangulation may be used in connection with a device associated with a particular vehicle 107 and/or the vehicle's operator and with various communication points (e.g., cellular towers or Wi-Fi access points) positioned at various locations throughout a geographic area to monitor the location of the vehicle 107 and/or its operator. The one or more location sensors may be used to receive latitude, longitude, altitude, heading or direction, geocode, course, position, time, and/or speed data (e.g., referred to herein as telematics data and further described herein below). The one or more location sensors may also communicate with the mapping computing entity, the data collection device, mobile computing entity, and/or similar computing entities.

As indicated, in addition to the one or more location sensors, the data collection device may include and/or be associated with one or more telematics sensors, modules, and/or similar words used herein interchangeably. For example, the telematics sensors may include vehicle sensors, such as engine, fuel, odometer, hubometer, tire pressure, location, weight, emissions, door, and speed sensors. The telematics data may include, but is not limited to, speed data, emissions data, RPM data, tire pressure data, oil pressure data, seat belt usage data, distance data, fuel data, idle data, and/or the like (e.g., referred to herein as telematics data). The telematics sensors may include environmental sensors, such as air quality sensors, temperature sensors, and/or the like. Thus, the telematics data may also include carbon monoxide (CO), nitrogen oxides (NOx), sulfur oxides (SOx), Ethylene Oxide (EtO), ozone ($O_3$), hydrogen sulfide ($H_2S$) and/or ammonium ($NH_4$) data, and/or meteorological data (e.g., referred to herein as telematics data).

In one embodiment, the ECM may be one of several components in communication with and/or available to the data collection device. The ECM, which may be a scalable and subservient device to the data collection device, may have data processing capability to decode and store analog and digital inputs from vehicle systems and sensors. The ECM may further have data processing capability to collect and present telematics data to the J-Bus (which may allow transmission to the data collection device), and output standard vehicle diagnostic codes when received from a vehicle's J-Bus-compatible on-board controllers 440 and/or sensors.

As indicated, a communication port may be one of several components available in the data collection device (or be in or as a separate computing entity). Embodiments of the communication port may include an Infrared data Association (IrDA) communication port, a data radio, and/or a serial port. The communication port may receive instructions for the data collection device. These instructions may be specific to the vehicle 107 in which the data collection device is installed, specific to the geographic area in which the vehicle 107 will be traveling, specific to the function the vehicle 107 serves within a fleet, and/or the like. In one embodiment, the data radio may be configured to communicate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, WiMAX, UWB, IR, NFC, Bluetooth, USB, Wibree, HomeRF, SWAP, and/or the like. Similarly, the customer computing entity 110 may operate in accordance with multiple wired communication standards and protocols, such as those described above with regard to the carrier/transporter computing entity 100 via a network interface 320.

3. Exemplary Item

An item/shipment 102 may be any tangible and/or physical object. Such items/shipments 102 may be picked up and/or delivered by a carrier/transporter. In one embodiment, an item/shipment 102 may be or be enclosed in one or more packages, parcels, bags, containers, loads, crates, items banded together, vehicle parts, pallets, drums, the like, and/or similar words used herein interchangeably. Such items 102 may include the ability to communicate (e.g., via a chip (e.g., an integrated circuit chip), RFID, NFC, Bluetooth, Wi-Fi, and any other suitable communication techniques, standards, or protocols) with one another and/or communicate with various computing entities for a variety of purposes. For example, the item 102 may be configured to communicate with a service point device 117 using a short/long range communication technology, as described in more detail below. Further, such items 102 may have the capabilities and components of the described with regard to the carrier/transporter computing entities 100, networks 105, vehicles 107, customer computing entities 110, electronic door hangers 115, user computing entities 120, and/or the like. For example, the item 102 may be configured to store item information/data. In example embodiments, the item information/data may comprise one or more of a consignee name/identifier, an item identifier, a service point (e.g., delivery location/address, pick-up location/address), instructions for delivering the item, an item delivery authorization code, information/data regarding if a service point device 117 is present at the service point, and/or the like. In this regard, in some example embodiments, an item may communicate send "to" address information/data, received "from" address information/data, unique identifier codes, and/or various other information/data. In one embodiment, each item may include an item/shipment identifier, such as an alphanumeric identifier. Such item/shipment identifiers may be represented as text, barcodes, tags, character strings, Aztec Codes, MaxiCodes, Data Matrices, Quick Response (QR) Codes, electronic representations, and/or the like. A unique item/shipment identifier (e.g., 123456789) may be used by the carrier to identify and track the item as it moves through the carrier's transportation network. Further, such item/shipment identifiers can be affixed to items by, for example, using a sticker (e.g., label) with the unique item/shipment identifier printed thereon (in human and/or machine readable form) or an RFID tag with the unique item/shipment identifier stored therein.

4. Exemplary Customer Computing Entity

Figure 3:
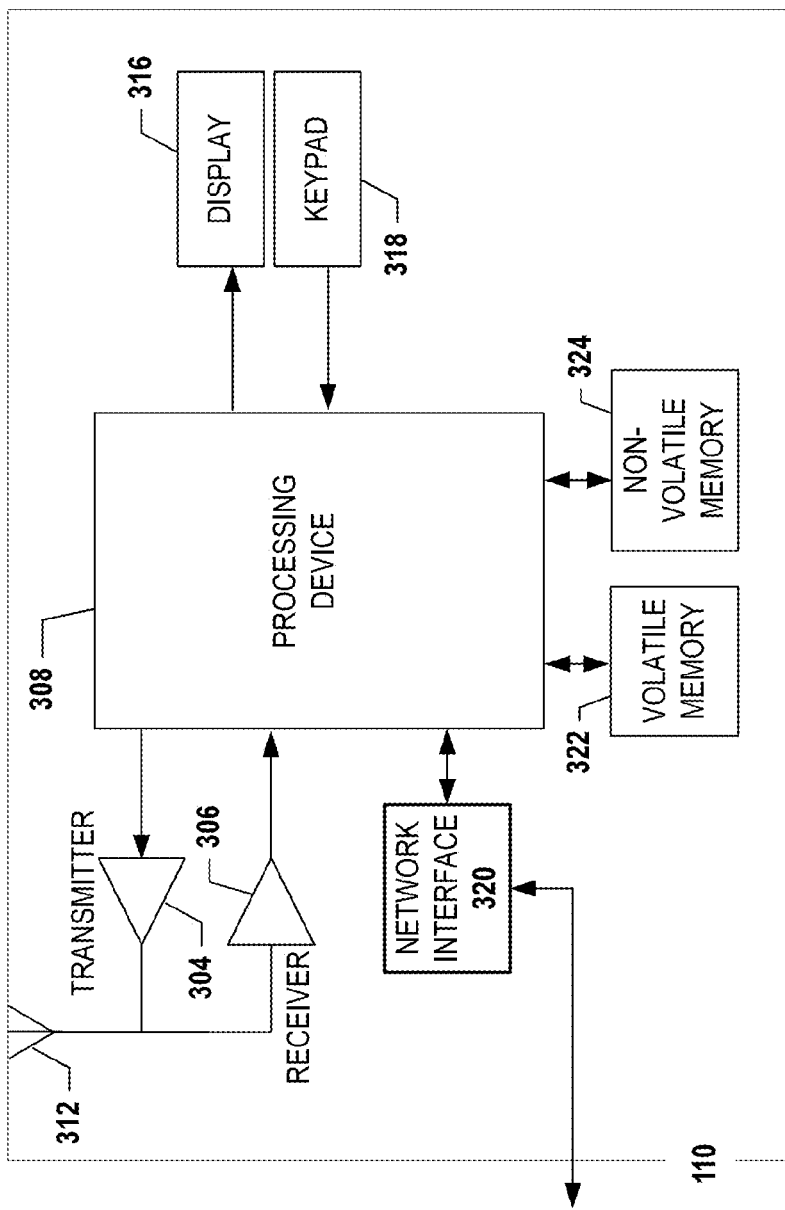
FIG. 3 is an exemplary schematic diagram of a customer computing entity according to one embodiment of the present invention.
Figure 4C:
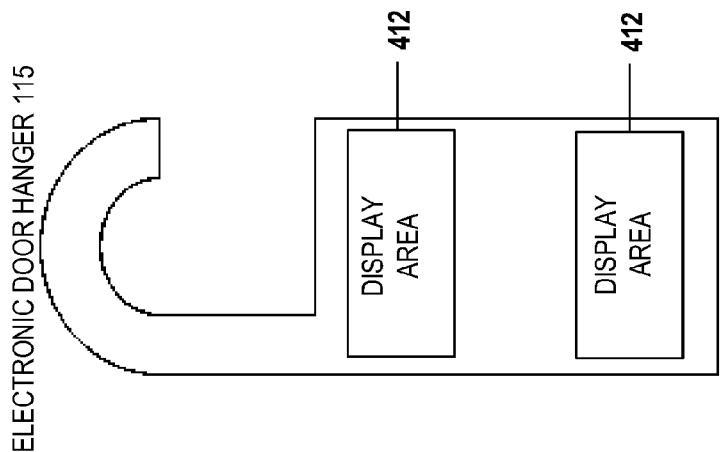
Figure 4B:
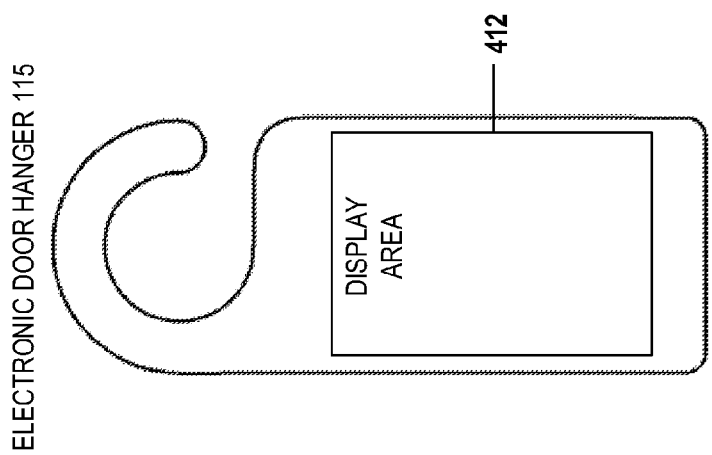
Figure 4A:
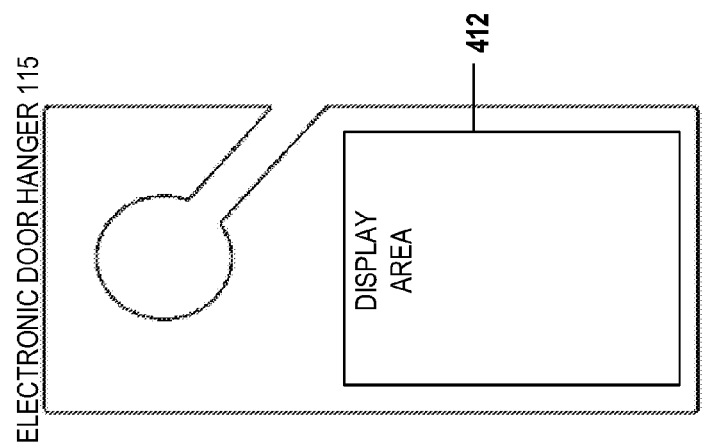
Figure 4G:
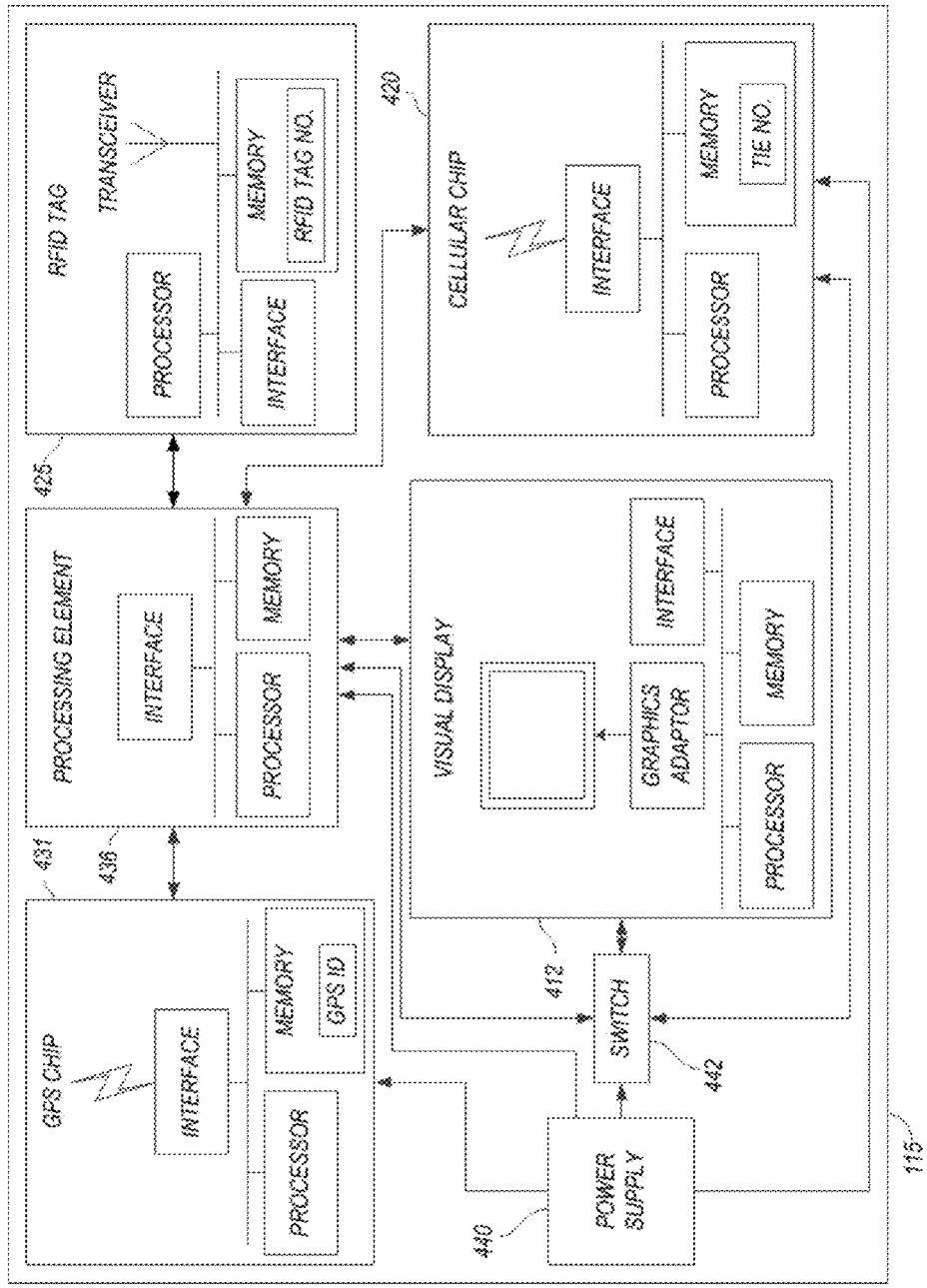

FIG. 3 provides an illustrative schematic representative of a customer computing entity 110 that can be used in conjunction with embodiments of the present invention. In one embodiment, a customer may be a consignor (person sending an item/shipment 102) or a consignee (intended recipient of an item/shipment 102). In example embodiments, a customer computing entity 110 may be registered with a service point device 117 (or the service point device 117 may be registered with the customer computing entity 110) such that the service point device 117 may provide notifications (e.g., doorbell activation notifications) to an individual operating the customer computing entity 110. In example embodiments, a customer computing entity 110 that is registered with the service point device 117 may have an electronic doorbell application operating thereon. The electronic doorbell application may be configured to receive notifications from the service point device, cause the notifications to be processed, and provide specific user interfaces (e.g., the alert interface) through the display of the customer computing entity 110 in response to processing notifications received from the service point device.

In one embodiment, a customer computing entity 110 may include one or more components that are functionally similar to those of the carrier/transporter computing entity 100, item 102, vehicle 107, electronic door hanger 115, user computing entity 120, and/or the like. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, iBeacons, proximity beacons, key fobs, RFID tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. As shown in FIG. 3, the customer computing entity 110 may include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information in accordance with air interface standards of applicable wireless systems. In this regard, the customer computing entity 110 may be capable of operating with one or more air interface standards, communication protocols, modulation types, and access types. More particularly, the customer computing entity 110 may operate in accordance with any of a number of wireless communication standards and protocols, such as those described above with regard to the carrier/transporter computing entity 100. In a particular embodiment, the customer computing entity 110 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, WiMAX, UWB, IR, NFC, Bluetooth, USB, Wibree, HomeRF, SWAP, and/or the like. Similarly, the customer computing entity 110 may operate in accordance with multiple wired communication standards and protocols, such as those described above with regard to the carrier/transporter computing entity 100 via a network interface 320.

Via these communication standards and protocols, the customer computing entity 110 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The customer computing entity 110 can also download changes, add-ons, and updates, for instance, to its firmware, software (e.g., including executable instructions, applications, program modules), and operating system.

According to one embodiment, the customer computing entity 110 may include a location determining aspects, device, module, functionality, and/or similar words used herein interchangeably. For example, the customer computing entity 110 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using GPS). The satellites may be a variety of different satellites, including LEO satellite systems, DOD satellite systems, the European Union Galileo positioning systems, the Chinese Compass navigation systems, Indian Regional Navigational satellite systems, and/or the like. This data can be collected using a variety of coordinate systems, such as the DD; DMS; UTM; UPS coordinate systems; and/or the like. Alternatively, the location information can be determined/identified by triangulating the customer computing entity's 110 position in connection with a variety of other systems, including cellular towers, Wi-Fi access points, and/or the like. Similarly, the customer computing entity 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine/identify the location of someone or something to within inches or centimeters.

The customer computing entity 110 may also comprise a user interface (that can include a display 316 coupled to a processing element 308) and/or a user input/interaction interface (coupled to a processing element f). For example, the user interface may be a user application, browser, user interface, and/or similar words used herein interchangeably executing on and/or accessible via the customer computing entity 110 to interact with and/or cause display of information from the carrier/transporter computing entity 100, as described herein. The user input/interaction interface can comprise any of a number of devices allowing the customer computing entity 110 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the customer computing entity 110 and may include a full set of alphabetic keys or set of keys that may be activated to provide a full set of alphanumeric keys. In addition to providing input, the user input/interaction interface can be used, for example, to activate or deactivate certain functions, such as screen savers and/or sleep modes.

The customer computing entity 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the customer computing entity 110. As indicated, this may include a user application that is resident on the entity or accessible through a browser or other user interface for communicating with the carrier/transporter computing entity 100, electronic door hanger 115, and/or various other computing entities.

In another embodiment, the customer computing entity 110 may include one or more components or functionality that are the same or similar to those of the carrier/transporter computing entity 100, as described in greater detail above. As will be recognized, these architectures and descriptions are provided for exemplary purposes only and are not limiting to the various embodiments.

In one embodiment, customer computing entities 110 may be fixed with regard to their geographic locations, such as by being in fixed positions at school entrances, bus stops, mall entrances, aisles of a store, in classrooms, on playgrounds, at intersections, on light poles, in cafeterias or hallways, on bridges, and/or the like. In another embodiment, customer computing entities 110 may be mobile with regard to their geographic locations. For example, one or more of the customer computing entities 110 may be disposed on school buses, worn by school bus drivers, be attached to package delivery vehicles, attached to mobile shipping containers, affixed to shopping carts or wheelchairs, positioned in passenger vehicles, and/or the like. As will be recognized, electronic door hangers 115 may also be mobile with regard to their geographic locations by being carried or worn by the respective users, attached to vehicles, and/or the like. As will be recognized, a variety of other approaches and techniques can be used to adapt to various needs and circumstances.

5. Exemplary Electronic Door Hanger

FIGS. 4A-4G represent exemplary depictions of components of an electronic door hanger 115. In one embodiment, an electronic door hanger 115 can be sized and shaped to hang on or around a variety of objects including door knobs, door locks, door levers, other door hardware, posts, fences, mailboxes, lights, and/or the like. FIGS. 4A-4F show particular embodiments in which electronic door hangers 115 are appropriately sized and shaped by molding plastic to hang on or around various objects. The electronic door hangers 115 can be created or molded from one or more plastics, such as Polyethylene Terephthalate (PET or PETE), High Density Polyethylene (HDPE), Plastic Polyvinyl Chloride (PVC), Low Density Polyethylene (LDPE), Polypropylene (PP), Polystyrene (PS), and/or the like. As will be recognized, the electronic door hanger 115 can also include or be made of a variety of other materials as well. In one embodiment, an electronic door hanger 115 (not shown) may also include a pouch that can hold or store various papers (e.g., invoices, receipts, advertisements, and/or the like) and/or comprise one or more labels.

In some embodiments, components of an electronic door hanger 115 may include one or more display areas/portions 412, one or more processing elements 436, one or more location determining aspects 431 (such as those described previously), one or more RFID tags 425, one or more power supplies 440, one or more power switches 442, one or more communications interfaces 420, and/or the like. A communications interface 420 may be a long range (e.g., radio transceiver) or short range (e.g., RFID tag, NFC) communications interface. A communications interface 420 may be capable of communicating in one or more cellular communications protocols, including, but not limited to, UMTS, CDMA2000, 1×RTT, WCDMA, TD-SCDMA, LTE, E-UTRAN, EVDO, HSPA, HSDPA, Wi-Fi, WiMAX, UWB, IR, NFC, Bluetooth, USB, Wibree, HomeRF, SWAP, and/or the like. The communications interface 420 may allow the electronic door hanger to communicate with carrier/transporter computing entities 100, customer computing entities 110, user computing entities 120, and/or the like. In certain embodiments, this may allow a carrier/transporter computing entity 100 (or other computing entity) to remotely wipe (e.g., delete) any information/data from the electronic door hanger 115. This may also allow the electronic door hanger 115 to establish connections and communicate with customer computing entities 110.

A communications interface 420 may be connected to a processing element 436 to transmit shipping information/data to the processing element 436 so that the information/data may be translated into a format that may be capable of being displayed on a display area/portion 412. A display area/portion 412 may be connected to a processing element 436 so that the display area/portion 412 may receive shipping information/data that is to be displayed. A display area/portion 412 may refer to any type of updateable electronic display, whether black and white or color, such as Gyricon, electrophoretic display, electrowetting display, Light-emitting diode (LED) display, liquid crystal display (LCD), bistable LCD, electronic paper display, or any similar type of updateable electronic display. A display area/portion 412 may further include displays such as electrochromic displays, printed electronic displays, or displays manufactured using organic electronics or plastics electronics and using materials such as conductive polymers, plastics, and small molecules.

A power supply 440 may be one of many types of power supplies, including a battery, a power sheet, photoelectric cell, and the like. Such power supplies 440 may be lightweight, flexible, and ultra-thin. Nevertheless, power supplies that are not lightweight, flexible, and/or ultra-thin may also be utilized in an electronic door hanger 115.

A power switch 442 may be any switch that may change the flow of the current or voltage applied by a power supply 440 to a display area/portion 412. A power switch 442 may be selectively activated by a processing element 436 in order to provide power to illuminate a display area/portion 412. As will be recognized, a variety of other approaches and techniques can be used to adapt to various needs and circumstances.

An electronic door hanger 115 may have a variety of other features and functionality, including those described in U.S. Pat. No. 7,511,617 and U.S. Publ. No. 2009-0319078, which are hereby incorporated herein in their entireties by reference.

6. Exemplary Service Point Device

Example embodiments provide for interaction with a service point device 117. In particular, the service point device 117 may be an electronic and/or computing device physically located at the service point and/or in and/or affixed to a building or structure located at the service point. Some examples of a service point device 117 include an electronic doorbell, beacon, storage locker, electronic mailbox, Internet of things enabled device, and/or the like. For example, in one embodiment, the service point device 117 is an interactive, electronic, or "smart" doorbell affixed to the exterior of a residential or commercial location. For example, an electronic doorbell may be affixed to a home, office building, trailer (e.g., field office), and/or other building.

In example embodiments, service point device 117 may include one or more components that are functionally similar to those of the carrier/transporter computing entity 100, the customer computing entity 110, the electronic door hanger 115, user computing entity 120, and/or the like. FIG. 5 provides a block diagram of an example service point device 117. For example, a service point device 117 may comprise a processor 150, a memory 152 (e.g., volatile and/or non-volatile memory), one more communication interfaces 154, and/or the like. As with other entities, the service point device 117 may include one or more imaging devices 158 (e.g., video cameras and/or still cameras) to capture image data (e.g., pictures, video, and/or the like). The service point device 117 may also include one or more activity or motion detection sensors 156 or capabilities for zones of interest, such as Light Detection and Ranging (LIDAR) sensors, laser-based distance sensors, infrared distance sensors, ultrasonic distance sensors, and/or the like. Moreover, one or more sensor arrays 156 may be configured to detect motion and trigger the imaging devices to collect, capture, and/or store image data. Additionally, the service point device 117 may be configured to communicate with one or more other computing entities (e.g., customer computing entity 110, user computing entity 120, and/or the like)

via one or more wired or wireless networks (e.g., through a communication interface 154). The service point device 117 may be further comprise a communications interface 154 configured to communication with one or more other computing entities (e.g., user computing entity 120, item 102, delivery vehicle 107, and/or the like) using a short/long range communication technology (e.g., Bluetooth technology, Bluetooth low energy technology, near field communication (NFC) technology, RFID technology, Wi-Fi technology, ZigBee technology, infrared technology, ultra-wideband technology, and/or any other suitable communication techniques, standards, or protocols. For example, a communications interface 154 may be in communication with one or more antenna 155 configured to receive and/or transmit and/or receive short/long range communications.

In example embodiments, the service point device 117 may comprise an exterior interface 160 and/or comprise and/or be in communication with an interior interface 162. In example embodiments, the exterior interface 160 is located on the exterior of the building or structure located at the service point. In example embodiments, if the service point device 117 is affixed to a building or structure, the exterior interface 160 may be located in the vicinity of the service point device 117 one the exterior of the building or structure. The interior interface 162 may be located anywhere within the building the service point device 117 is affixed to and/or associated with. In an example embodiment, the interior interface 162 is secured to an interior wall of the building the service point device 117 is affixed to and/or associated with. In another example embodiment, the interior interface 162 is configured to be moved from room-to-room within the building the service point device 117 is affixed to and/or associated with. The interior and/or exterior interfaces 160, 162 may comprise one or more speakers or other components configured for producing an audible signal; a keypad (soft or hard) comprising one or more press-able, selectable, and/or otherwise interactive buttons/keys; a display (e.g., configured for displaying at least notifications and/or pictures, video, and/or the like captured by the one or more imaging devices 158 of the service point device 117), and/or the like. In example embodiments, the processor 150 may be in communication with the interior interface 162 via a short/long range communication technology, a wired or wireless network, or through a direct wired (e.g., USB, Ethernet, or other data cable) or wireless connection. In some embodiments, the interior interface 162 may be functionally coupled to the processor 150, and/or may be operated by a processing element dedicated to the interior interface 162. As will be recognized, these architectures and descriptions are provided for exemplary purposes only and are not limiting to the various embodiments.

7. Exemplary User Computing Entity

In one embodiment, a user computing entity 120 may be operated by carrier/transporter personnel/operator (e.g., picking up and/or delivering items to customers). In one embodiment, a user computing entity 120 may include one or more components that are functionally similar to those of the carrier/transporter computing entity 100, the customer computing entity 110, the electronic door hanger 115, and/or the like. For example, in one embodiment, each user computing entity 120 may include one or more processing elements (e.g., CPLDs, microprocessors, multi-core processors, coprocessing entities, ASIPs, microcontrollers, and/or controllers), one or more display device/input devices (e.g., including user interfaces), volatile and non-volatile storage or memory, and/or one or more communications interfaces. For example, the user interface may be a user application, browser, user interface, interface, and/or similar words used herein interchangeably executing on and/or accessible via the user computing entity 120 to interact with and/or cause display of information, as described herein. This may also enable the user computing entity 120 to communicate with various other computing entities, such as carrier/transporter computing entities, customer computing entities 110, electronic door hangers 115, and/or various other computing entities. As will be recognized, these architectures and descriptions are provided for exemplary purposes only and are not limiting to the various embodiments.

IV. EXEMPLARY SYSTEM OPERATION

As noted above, example embodiments increase the interactivity of delivering an item to a service point. In example embodiments, a service point device (e.g., service point device 117) may be leveraged to provide a delivery vehicle driver with an indication of whether or not an individual is available to receive or provide an item 102 at the service point, whether or not an item 102 to be picked up at a service point is positioned in an accessible location at the service point and/or provide access to the accessible location, receive a remote (near) real-time electronic signature from an individual authorizing the delivery of the item at the service point, provide an electronic information notice if a delivery attempt of an item 102 is deferred or fails, monitor an item left at the service point, and/or the like. Example embodiments may further leverage interaction with a plurality of service point devices each located at a service point of a dispatch plan to provide for real-time or near real-time dynamic dispatch plan updates. In example embodiments, the service point device is a computing device located at the service point. In an example embodiment, the service point device is a doorbell affixed to a building associated with (e.g., located at) the service point; however, it should be understood that the service point device need not be an electronic doorbell in various embodiments. Various aspects of the present embodiment will now be described in more detail.

1. Map Information/Data

In example embodiments, a service point may be a delivery location, a pick-up location, or other location at which a delivery vehicle and/or driver are to provide a service on behalf of the carrier. In one embodiment, a "service point" may be any identifiable location, such as one or more addresses, delivery locations, parking locations, sidewalks, highways, trails, alleys, paths, walkways, streets, street segments, entrance or exit ramps, roads, longitude and latitude points, geocodes, zip codes, area codes, territories, cities, counties, states, provinces, countries, stops (e.g., pick up stops, delivery stops, vehicle visits, stops) geofenced areas, geographic areas, landmarks, buildings, bridges, and/or other identifiable locations. For example, a service point may be a residential location, such as one or more homes, one or more mobile homes, one or more apartments, one or more apartment buildings, one or more condominiums, one or more townhomes, one or more points at such locations, and/or the like. The service point may also be any specific location at a residential location, e.g., (e.g., front door of a residence, side door of a residence, and/or the like). A service point may also be a commercial location, such as one or more stores in a mall, one or more office buildings, one or more office parks, one or more offices of an apartment complex, one or more garages, one or more warehouses, one or more restaurants, one or more stores, one or more retail locations, one or more points at such locations, and/or the like. The service point may also be any specific location at a commercial location, e.g., (e.g., front door of a commercial, dock of a commercial location, and/or the like). A service point may be one or more streets, one or more street segments, one or more zones, one or more areas, one or more latitude and/or longitude points (e.g., 33.7869128, −84.3875602), one or more geocodes, and/or the like. A service point may be any identifiable location. As will be recognized, a variety of approaches and techniques can be used to adapt to various needs and circumstances.

In certain embodiments, service points can be represented digitally in geographical maps as map information/data. Map information/data may include boundary, location, and attribute data corresponding to the various service points and/or the like. As will be recognized, the map information/data can be stored using a variety of formats, layers, and/or the like—including shapefiles, ArcMaps, geodatabases, coverages, imagery, rasters, computer-aided drafting (CAD) files, other storage formats, and/or the like. For instance, the carrier/transporter computing entity 100 can appropriately store/record map information/data as a part of a digital map, e.g., as part of a feature layer, raster layer, service layer, icons/graphics layer, geoprocessing layer, basemap layer, satellite layer, street network layer, points of interest layer, service point layer, and/or the like. The term digital map is intended to include any map that can electronically display geographic areas. As will be described in greater detail below, the geographical maps and/or map information/data can be used to manage, create, modify, delete, add, and/or the like service points to assigned areas, regions, routes, paths, and/or the like.

As will be recognized, service points can be represented in digital maps as being accessible by one or more street networks or street segments of a street network. A "street network" is collection of street segments that comprise navigable, traversable, travelable, and/or similar words used herein interchangeably roads, streets, highways, paths, trails, walkways, entrance and exit ramps, bridges, sidewalks, alleys, and/or the like that can be used to access service points. Similarly, service points, street networks, and/or the like can be represented in digital maps as navigable/traversable/travelable segments or points for traveling to and/or from service points.

In one embodiment, the carrier/transporter computing entity 100 can store information/data associated with each service point in an object or other data structure. The object or data structure may comprise a variety of information/data associated with each service point, such as a consignee name, pickup or delivery identifier, street name, street number, street prefix, street suffix, street type, city, state, province, territory, country, postal code, residential or commercial indicator, street classification, directionals (e.g., one way <specific to which way> or both ways), longitude and latitude, geocode, location identifier, and/or the like. Similarly, the carrier/transporter computing entity 100 can store information/data associated with each street segment of the street network in an object or other data structure. The object or data structure may comprise a variety of information/data associated with each street segment, such as a street segment identifier, street name, street number range, street prefix, street suffix, street type, city, state, province, territory, country, postal code, street classification, directionals (e.g., one way <specific to which way> or both ways), longitude and latitude points defining the street segment, speed limits of one or more portions of the street segment, and/or the like.

For example, in one embodiment, a service point may be represented by and/or associated with a longitude and latitude, a geocode, a nearest street segment, an address, and/or the like. Similarly, street segments of street networks may be represented by or associated with a street name, a segment identifier, a connecting node, an address or address range, a series of longitude and latitude coordinates, and/or the like that define the overall shape and location of the street segment. As will be recognized, a variety of other approaches and techniques can be used to adapt to various needs and circumstances.

In one embodiment, the carrier/transporter computing entity 100 may store digital maps. In another embodiment, the carrier/transporter computing entity may be in communication with or associated with one or more mapping websites/servers/providers/databases (including providers such as maps.google.com, bing.com/maps/, mapquest.com, Tele Atlas®, NAVTEQ®, and/or the like) that provide map information/data of digital maps to a variety of users and/or entities. Using the digital maps, an appropriate computing entity can provide map information/data, for example, about service points (e.g., their locations, attributes, and/or the like) and/or their corresponding street networks based on map information/data. An appropriate computing entity can also provide map information/data, for example, about the geographic areas, regions, groupings, routes, paths, regions, and/or similar words used herein interchangeably about the different service points on the street networks. For instance, the map information/data may include a route for delivering one or more items to different service points, the most efficient order for delivering items to the service points, directions for traveling to and/or from the service points, the estimated distance for traveling to and/or from the service points, the expected time for traveling to and/or from the service points, and/or the like. The map information/data may also include other information/data about service points and/or traveling to and from service points, such as current estimated speeds for associated street segments, historical speeds for associated street segments, nearest street segments, posted speed limits for associated street segments, interpolated locations of service points, reverse geocoded locations of service points, latitude and longitude points of service points, distances between various service points, directions, stop orders, and/or the like. Certain examples of these types of information/data are described in U.S. Publ. No. 2013-0304349, which is hereby incorporated in its entirety by reference.

In one embodiment, although not necessary, the map information/data, service point information/data, route information/data, and/or the like can be provided to the driver of the vehicle 100 in a variety of ways and using various formats. For instance, the mobile computing entity 105 (or other appropriate device) may provide turn-by-turn navigation to the driver of a vehicle 100 for traveling between each stop (e.g., a pickup, delivery, or visit at a service point). As will be recognized, a variety of other techniques and approaches can be used to adapt to various needs and circumstances.

In one embodiment, the carrier/transporter computing entity 100 can identify, retrieve, determine, and/or similar words used herein interchangeably map information/data associated with the service points, street networks, routes, paths, and/or the like. For example, the carrier/transporter computing entity 100 can identify the service points by address, address portions (e.g., street number, street name, type, and/or the like), latitude and longitude points, routes, paths, geographic areas, service point IDs, and/or the like.

Table 1 below shows a textual view of eighteen service points each associated with a route, a stop, an address, a city, a state, a longitude and latitude, and/or the like.

TABLE 1

| Route: Stop | Address | City | State |
| --- | --- | --- | --- |
| R1: 1 | 1 STREET ADDRESS | ANYTOWN | GEORGIA |
| R1: 2 | 2 STREET ADDRESS | ANYTOWN | GEORGIA |
| R1: 3 | 3 STREET ADDRESS | ANYTOWN | GEORGIA |
| R1: 4 | 4 STREET ADDRESS | ANYTOWN | GEORGIA |
| R1: 5 | 5 STREET ADDRESS | ANYTOWN | GEORGIA |
| R1: 6 | 6 STREET ADDRESS | ANYTOWN | GEORGIA |
| R2: 1 | 7 STREET ADDRESS | ANYTOWN | GEORGIA |
| R2: 2 | 8 STREET ADDRESS | ANYTOWN | GEORGIA |
| R2: 3 | 9 STREET ADDRESS | ANYTOWN | GEORGIA |
| R2: 4 | 10 STREET ADDRESS | ANYTOWN | GEORGIA |
| R2: 5 | 11 STREET ADDRESS | ANYTOWN | GEORGIA |
| R2: 6 | 12 STREET ADDRESS | ANYTOWN | GEORGIA |
| R3: 1 | 13 STREET ADDRESS | ANYTOWN | GEORGIA |
| R3: 2 | 14 STREET ADDRESS | ANYTOWN | GEORGIA |
| R3: 3 | 15 STREET ADDRESS | ANYTOWN | GEORGIA |
| R3: 4 | 16 STREET ADDRESS | ANYTOWN | GEORGIA |
| R3: 5 | 17 STREET ADDRESS | ANYTOWN | GEORGIA |
| R3: 6 | 18 STREET ADDRESS | ANYTOWN | GEORGIA |

The carrier/transporter computing entity 100 can also identify the interpolated or reverse geocoded locations (e.g., service points) on the street networks for one or more of the service points, for instance. And, the carrier/transporter computing entity 100 can reverse geocode the latitude and longitude points of the service points if available, such as the location of 1 Street Address, Anytown, GA being located at 33.7869128, −84.3875602. As will be recognized, a variety of other techniques and approaches can be used to adapt to various needs and circumstances.

The information/data about service points, routes, paths, regions, geographic areas, street networks, street segments, directions, altitudes, longitudes, latitudes, speed limits, direction restrictions, and/or the like can be collected in a variety of ways.

2. Registration

In example embodiments, a customer may register and/or establish a customer profile with a carrier indicating that a delivery address (or pick up address) associated with the customer (e.g., a home address, office address, and/or other address that items shipped to the customer may be delivered to the customer) has a service point device 117 located thereat. In one embodiment, this registration/customer profile may further include being part of a customer pick-up, delivery, and/or returns program. As will be recognized, a customer (e.g., consignor, consignee, third party, and/or the like) may be an individual, a family, a company, an organization, an entity, a department within an organization, a representative of an organization and/or person, and/or the like. To register, a customer (e.g., a customer or customer representative operating a customer computing device 110) may access a webpage, application, dashboard, browser, or portal of a carrier, such as United Parcel Service of America, Inc. (UPS).

In one embodiment, as part of the enrollment/registration process, the customer (e.g., operating a customer computing device 110) may be requested to provide biographic and/or geographic information/data by the carrier/transporter computing entity 100 (e.g., via a registration module). Such information/data may be manually input or provided by allowing access to other accounts, such as Facebook, Gmail, Twitter, PayPal, and/or the like. For instance, the customer may provide the customer's name, such as a first name, a last name, a company name, an entity name, and/or an organization name. The customer (e.g., consignor or consignee) may also provide any aliases associated with the customer. For instance, if the customer (e.g., consignor or consignee) were an individual named Joseph Brown, the customer (e.g., consignor or consignee) may provide Joe Brown or Joey Brown as aliases.

The customer (e.g., consignor or consignee) may also provide one or more physical addresses associated with the customer (e.g., street address, city, state, postal code, and/or country) to the carrier/transporter computing entity 100. For instance, Joseph Brown's primary residential address of 105 Main Street, Atlanta, Ga. 30309, USA, may be provided to the carrier/transporter computing entity 100. Further, one or more secondary residential addresses may also be provided to the carrier/transporter computing entity 100 for association with Mr. Brown's account and profile, such as 71 Lanier Islands, Buford, Ga. 30518, USA. As will be recognized, the residential addresses may include weekend residences, family member residences visited by the customer, and/or the like. Additionally, the customer (e.g., consignor or consignee) may also provide one or more business addresses associated with the customer (e.g., street address, city, state, postal code, and/or country) to the carrier/transporter computing entity 100. For example, Mr. Brown may have a primary business address of 1201 West Peachtree Street, Atlanta, Ga. 30309, USA. One or more secondary business addresses may also be provided to the carrier/transporter computing entity 100 for association with Mr. Brown's account and profile, such as 101 South Tryon Street, Charlotte, N.C. 28280, USA; 950 F Street, NW, Washington, D.C. 20004, USA; and 90 Park Avenue, New York, N.Y. 10016, USA. As will be recognized, the business addresses may include various office locations for a single enterprise, multiple office locations for various enterprises, and/or the like. As will be recognized, the customer (e.g., consignor or consignee) may provide other biographic and/or geographic information/data to adapt to various needs and circumstances.

In example embodiments, biographic and/or geographic information/data may further comprise information/data relating to a service point device 117 located at an address associated with the customer. For example, in addition to providing the street address for a physical address associated with the customer, the customer may further provide an indication of whether the physical address is associated with a service point device 117. For example, the customer may indicate that a service point device 117 is located at the primary residential address of 100 Main St. Atlanta, Ga. 30309, USA. The customer may then provide any information/data required for remote communication with the service point device 117 located at the indicated address. For example, the customer may indicate one or more modes of communication by which the service point device 117 is capable of communicating, an internet protocol (IP) address associated with and/or assigned to the service point device 117, a name associated with the service point device 117 (e.g., Brown Family's doorbell), and/or other information/data needed to facilitate remote communication with the service point device 117. In example embodiments, the customer may further provide preferences for use of the service point device 117. For example, the customer (e.g., operating a customer computing entity 120) may indicate a preferred activation zone for remotely activating the service point device 117. For example, the activation zone may be a number of stops remaining before the delivery vehicle 107 reaches the service point associated with the service point device 117, amount of time before the delivery vehicle 107 is expected to reach the service point associated with the service point device 117, distance the delivery vehicle 107 will travel prior to the delivery vehicle 107 arriving at the service point, and/or the like.

In one embodiment, once the carrier/transporter computing entity 100 receives the necessary biographic and/or geographic information/data from the customer, the carrier/transporter computing entity 100 may perform one or more validation operations. For example, the carrier/transporter computing entity 100 may determine whether the primary address (and/or other addresses) in the specified country or postal code is eligible for a customer pick-up, delivery, and/or returns programs. The carrier/transporter computing entity 100 may also determine whether the primary address (and/or other addresses) is valid, e.g., by passing the primary address through one or more address cleansing and/or standardization systems. The carrier/transporter computing entity 100 may perform a variety of fraud prevention measures as well, such as determining whether the customer (e.g., consignor or consignee) or one of the customer's addresses has been "blacklisted" from customer pick-up, delivery, and/or returns programs. As will be recognized, a variety of other approaches and techniques can be used to adapt to various needs and circumstances.

In one embodiment, the carrier/transporter computing entity 100 may create a customer profile for the customer via the enrollment/registration process. Accordingly, the carrier/transporter computing entity 100 may create and store various customer profiles (e.g., via a database stored, for example, in non-volatile memory 210). In addition to at least the information/data described above, a customer profile may include one or more corresponding usernames and passwords. As will be recognized, each of the physical addresses may be associated with the customer's profile.

In one embodiment, in addition to the physical addresses, the customer (e.g., operating a customer computing device 110) may also input, request, or be automatically generated and assigned a "virtual address." The virtual address can be a combination of alphanumeric characters to identify a customer or customer profile. The virtual address can be stored by the carrier/transporter computing entity 100 in association with the customer's profile. For example, Joseph Brown (e.g., operating a customer computing device 110) may input a request for a unique virtual address such as BigBrown8675309 or any other unique virtual address. In another embodiment, the carrier/transporter computing entity 100 may automatically generate and assign a unique virtual address for the customer, such as assigning virtual address 1XR457RS7 to Joseph Brown. Such virtual addresses can be used by customers who do not want to (a) provide their physical addresses to merchants or other third parties, (b) have their physical addresses printed on labels placed on the exterior of items, and/or (c) the like. For instance, this may enable a consignor to ship an item using only BigBrown8675309 or 1XR457RS7 as the destination address (e.g., virtual address) using the appropriate carrier. Upon induction of the item into the carrier's transportation and logistics network, carrier personnel can read (e.g., manually or with the aid of a device) the virtual address on the item/shipment (e.g., BigBrown8675309 or 1XR457RS7), look up the appropriate physical delivery address for the item/shipment based on the consignee's profile (e.g., search for the customer profile associated with the virtual address), and route the item/shipment accordingly (including the use of automatic service schedules). In certain embodiments, the item/shipment may be routed only using the virtual address. That is, each item/shipment the item/shipment is handled by carrier personnel, a user computing entity 120 (in communication with the carrier/transporter computing entity 100) operated by the carrier personnel can cause display of the appropriate handling or routing instructions while masking the actual physical delivery address. In other embodiments, however, once the item/shipment with the virtual address is inducted into the carrier's transportation and logistics network, carrier personnel may place a label on the item/shipment that indicates the physical delivery address (e.g., based on an address associated with the profile and/or automatic service schedule). Such virtual address concepts are disclosed in U.S. Pat. No. 8,108,321, which is hereby incorporated in its entirety by reference. Both physical addresses and virtual addresses may be referred to herein interchangeably as "addresses."

In addition to the virtual address, the carrier/transporter computing entity 100 may also generate and store an internal customer identifier in association with the customer profile, such as a global unique identifier (GUID) or a universally unique identifier (UUID). For instance, in one embodiment, the customer identifier may be a 128-bit value displayable as hexadecimal digits with groups separated by hyphens. By way of example, the customer identifier for Joseph Brown may be 21EC2020-3AEA-4069-A2DD-08002B30309D. In one embodiment, a customer identifier may be used to uniquely identify a customer profile. In another embodiment, a customer identifier may be used to uniquely identify a given address (e.g., physical address or virtual address) associated with a customer profile. In such an embodiment, if a customer profile is associated with four addresses, the carrier/transporter computing entity 100 may generate and store four customer identifiers in association with the customer profile (or use one customer identifier for all the addresses for the customer). The customer identifier may also be stored in association with item/shipment information/data for an item/shipment to associate the item/shipment (and its shipping data) with the (a) correct customer (e.g., customer profile) and/or (b) correct address for a customer. For instance, the item/shipment information/data for all shipments corresponding to Joseph Brown's customer profile may be appended with the customer identifier created for Joseph Brown. In various embodiments, using this approach allows items/shipments (and their shipping data) to be linked to appropriate customer profiles. Thus, when Joseph Brown accesses his account, he can view all of his shipments (e.g., those shipments with item/shipment information/data appended with his customer identifier (or other identifier)). Similarly, any actions for an item/shipment or customer can be passed to the item/shipment information/data for the item/shipment (including carrying out automatic service schedules). Additionally, if a service point device 117 is located at the delivery address for the item may be easily determined using the appended customer identifier (or other identifier). In other words, the customer identifier appended to the item/shipment information/data resolves to the corresponding customer profile/account and/or address. The item/shipment information/data may have multiple customer identifiers appended—one or more customer identifiers for the consignor and one or more customer identifiers for the consignee.

In one embodiment, a customer profile may correspond to one or more customer pick-up, delivery, and/or returns programs. For instance, a customer (e.g., operating a customer computing device 110) may subscribe to a specific customer pick-up, delivery, and/or returns program. In one embodiment, there may be several customer pick-up, delivery, and/or returns programs from which to choose, such as a free customer pick-up, delivery, and/or returns program and a premium customer pick-up, delivery, and/or returns program. As will be recognized the customer pick-up, delivery, and/or returns program may have a variety of benefits. For example, the customer pick-up, delivery, and/or returns program may allow customers to have access to certain features, e.g., pick-up and delivery alerts, approximate pick-up and delivery times, pick-up and delivery confirmations, change pick-up and delivery options, electronically authorize the release of an item, and/or route items/shipments to will call. Similarly, the customer pick-up, delivery, and/or returns program (e.g., requiring a fee) may allow customers to have access to certain features—such as the ability to route items/shipments to other retail locations, reschedule pick-ups and deliveries, request that items/shipments be delivered to another address, and/or provide instructions for pick-up or delivery. Payments for such fees may be in a variety of forms, such as via debit card, credit card, direct credits, direct debits, cash, check, money order, Internet banking, e-commerce payment networks/systems (e.g., PayPal™, Google Wallet, Amazon Payments), virtual currencies (e.g., Bitcoins), award or reward points, and/or the like. As will be recognized, these features are provided for illustrative purposes and are not limiting to embodiments of the present invention. Moreover, a variety of other approaches and techniques can be used to adapt to various needs and circumstances.

In one embodiment, once a customer profile has been created by the carrier/transporter computing entity 100, the customer (e.g., operating a customer computing device 110) can provide various preferences associated with the customer delivery program to the carrier/transporter computing entity 100 via an interface, for example. For instance, the customer (e.g., operating a customer computing device 110) can provide a variety of preferences, such as communication preferences, service schedule preferences, delivery preferences, delivery options, remote activation preferences, and/or delivery instructions. The customer (e.g., operating a customer computing device 110) may also update any information/data through the appropriate interface (e.g., browser, dashboard, webpage, application).

In example embodiments, a customer (e.g., operating a customer computing device 110 and/or an interior interface 162) may register and/or establish a customer profile through the service point device 117 and/or a provider related thereto. For example, the customer may register and/or establish a customer profile with the provider of an electronic doorbell application operating on the customer computing device 110. In some such embodiments, the registration and/or customer profile information may be shared with a service provider such as a carrier. In still other embodiments, the customer may not register and/or may not establish a customer profile prior to the service point device 117 being leveraged for the timely and efficient delivery of one or more items.

3. Remotely Determining Availability at a Service Point

In example embodiments, an item is delivered to a service point having a service point device 117. For example, the service point device 117 may be leveraged to determine if an individual is available to receive the item at the service point. For example, item information/data corresponding to the item may indicate that delivery of the item requires a signature from the individual receiving the item (e.g., the consignee to whom the item is to be delivered and/or an agent thereof). In another example, a service point may be associated with instructions that any item delivered to the item requires the item to be received by an individual, and/or the like. If delivery cannot be made to the service point (e.g., because an individual is not available to receive the item) an electronic information notice may be provided. The electronic information notice may provide the individual with information/data (and/or access thereto) for picking up the item at an alternate location (e.g., a UPS store, a manned or unmanned locker location, an access point, and/or the like), scheduling delivery of the item, and/or the like.

FIG. 6 provides a flowchart illustrating various processes and procedures that may be completed to deliver an item 102 to a service point having a service point device 117. Starting at block 502, it is determined that a service point device 117 is present at an upcoming stop. For example, the user computing entity 120, delivery vehicle 107, or carrier/transporter computing entity 100 may determine that an upcoming service point to which a delivery vehicle is scheduled to deliver an item is known to have a service point device 117 present thereat. For example, the delivery vehicle may be following a dispatch plan, delivery plan, or itinerary (referred to as a dispatch plan herein). The dispatch plan may comprise an ordered list of service points at which the delivery vehicle driver is to delivery one or more items. Based on the dispatch plan, the next one, two, or few upcoming service points may be identified. For example, the immediate next service point or the next two, three, or four service points may be identified.

For example, the carrier/transporter computing entity 100 may be configured to generate, create, and/or the like a dispatch plan for performing the final delivery of the item from a facility to a service point (e.g., a delivery address). The dispatch plan identifies a sequence of service points (e.g., service points) and associated deliveries for a vehicle 107 to perform in a particular time frame (e.g., a work shift, a portion of a shift, etc.) In some cases a service point may be associated with one or more service points (e.g., delivery addresses) for delivery of one or more items. U.S. Pat. No. 7,624,024 entitled Systems and Methods for Dynamically Updating a Dispatch Plan, filed Apr. 18, 2005, provides a general description of dispatch plans and how these plans may be generated and updated. U.S. Pat. No. 7,624,024 is incorporated herein in its entirety by reference. The dispatch plan may include service points (e.g., delivery locations/addresses and/or pick-up locations/addresses), estimated arrival times at the service points and/or estimated departure times from the service points.

One or more of the upcoming service points of the dispatch plan may be associated with a customer profile stored by the carrier/transporter computing entity 100 (or accessible thereto). Based on the customer profile, it may be determined if the service point has a service point device 117 thereat. For example, a service point device 117 may be affixed to a building located at the service point. In another example, it may be determined that an upcoming service point has a service point device 117 thereat by attempting to communicate with the service point device 117 and receiving a response therefrom. In another example, item information/data stored by the item 102 that is to be delivered to one of the identified upcoming service points may indicate that a service point device 117 is located at the service point. For example, the item 102 may provide the user computing entity 120 with item information/data relevant to the delivery of the item to the service point when (e.g., in response to) the service point being identified as an upcoming service point.

For example, after the dispatch plan is established and the associated items are loaded onto the appropriate delivery vehicle 107, the carrier/transporter computing entity 100 may track the delivery vehicle 107 and may determine if an upcoming service point is associated with a service point device 117. For example, as the delivery vehicle 107 progresses through the dispatch plan, delivery progress information/date and/or location information/data may be collected (e.g., by the delivery vehicle 107, through the user computing entity 120, and/or the like). In various embodiments, the delivery progress data may include an indication of which service points from the dispatch plan have been completed and/or which service points are still in need of service. For example, the user computing entity 120 may collect data indicating the commencement or completion of a delivery at a service point. This may be based on service events (e.g., scan item, receiving consignee signature and the like), a sensed location of the user computing entity 120 (e.g., location within threshold distance of service point, entering/exiting geo-fence) and/or input received from the service provider (e.g., input indicating commencement or completion). By comparing this progress data against the dispatch plan, the carrier/transporter computing entity 100 and/or the user computing entity 120 can determine the progress of the delivery process. The location data/information may include delivery vehicle 107 location (e.g., based on location-determining devices, location sensors and/or other telemetry location services) and/or the user computing entity 120 location. In various embodiments, these location determining devices can provide real-time and/or near real-time locations of the vehicle 107 and/or delivery vehicle driver (e.g., via location of the user computing entity 120). In some embodiments, location data may be used in conjunction with telematics data to provide delivery progress data automatically. For example, telematics data indicating the vehicle status (e.g., engine off, 0 mile per hour, seat belt released) may be combined with location data (e.g., delivery vehicle 107 and/or user computing entity 120 location) being within a threshold distance of a predetermined service point may indicate the commencement of a delivery point. Similarly, telematics data indicating the starting of the vehicle (e.g., engine start, threshold speed, seat belt on) combined with location data being within a threshold distance of a predetermined service point may indicate the completion of a service point. In various embodiments, the location data and the contextual data may be matched through a common data element (e.g., a time stamp from GPS). The carrier/transporter computing entity 100 compares the tracking data corresponding to the delivery vehicle 107 against the activation criteria established for the items associated with the remaining service points (and/or for the customer profile corresponding to the item and/or service point). For example, the customer may request remote activation within a configurable and/or user-selected activation zone. For example, the activation zone may be a number of stops remaining before the delivery vehicle 107 reaches the service point associated with the service point device 117, amount of time before the delivery vehicle 107 is expected to reach the service point associated with the service point device 117, distance the delivery vehicle 107 will travel prior to the delivery vehicle 107 arriving at the service point, and/or the like. The carrier/transporter computing entity 100 and/or user computing entity 120 may identify item information/data and/or customer profile(s) associated with the remaining service points and identify those service points that that are associated with a service point device 117. The carrier/transporter computing entity 100 and/or user computing entity 120 may further identify the activation zone corresponding to any identified service point device 117. The carrier/transporter computing entity 100 and/or user computing entity 120 may then compare the current progress and/or location of the delivery vehicle 107 to determine if any upcoming service points are associated with a service point device 117 (e.g., have a service point device 117 located thereat).

At block 504, the delivery vehicle continues to approach the service point having the service point device 117 thereat. At block 506, it is determined if the delivery vehicle is within a configurable activation zone. For example, the user computing entity 120, delivery vehicle 107, or item 102, may determine if the delivery vehicle is within a configurable activation zone. In example embodiments, a current (e.g., real-time or near real-time) geolocation of the user computing entity 120, delivery vehicle 107, or item 102 (e.g., determined by a GPS or other location sensor associated therewith) may be used to determine if the delivery vehicle or item is within a configurable activation zone. In example embodiments, the activation zone may be an expected time to arrival at the service point (e.g., 30 seconds, 1 minute, 2 minutes, 5 minutes, 10 minutes, and/or the like), a distance to the service point (e.g., tenth of a mile, quarter of a mile, half a mile, one mile, two miles, five miles, ten miles, and/or the like), a position within the dispatch plan or itinerary (e.g., when the immediately preceding delivery stop has been completed, and/or the like), when the user computing entity 120, delivery vehicle 107, or item 102 is within range to communicate with the service point device 117 using a short/long range communication technology, and/or the like. In example embodiments, the configurable activation zone may be service point or dispatch plan specific. For example, a dispatch plan for performing deliveries to urban service points may use a different configurable activation zone than a dispatch plan or itinerary for performing deliveries to rural service points. Similarly, if a service point is a residential location, a different configurable activation zone may be used than if the service point is a commercial location. In another example, the configurable activation zone may be day of the week, or time of day dependent. In yet another example, an individual (e.g., operating a customer computing entity 110) associated with a service point may edit or update a customer profile associated with the service point to indicate a preferred configurable activation zone for the service point. For example, the carrier/transporter computing entity 100 and/or user computing entity 120 may compare the current progress and/or location of the delivery vehicle 107 to determine if the current progress and/or location of the delivery vehicle 107 satisfy the activation zone corresponding to any of the upcoming service points associated with a service point device 117 (e.g., have a service point device 117 located thereat). For example, the carrier/transporter computing entity 100 and/or user computing entity 120 may analyze the current progress and/or location of the delivery vehicle 107 to determine if the delivery vehicle 107 and/or the item 102 are within the configurable activation zone corresponding to any of the upcoming service points associated with a service point device 117 (e.g., have a service point device 117 located thereat).

If, at block 506, it is determined that the user computing entity 120, delivery vehicle 107, or item 102 is not within the configurable activation zone, the process returns to block 504. If, at block 506, it is determined that the user computing entity 120, delivery vehicle 107, and/or item 102 is within the configurable activation zone, the process continues to block 508. At block 508, the service point device 117 is remotely activated. For example, the user computing entity 120, delivery vehicle 107, or item 102 may provide (e.g., transmit) a communication through a short/long range communication technology to the service point device 117 indicating that an item is to be delivered to the service point and requesting an indication of whether or not an individual is available at the service point to receive the item. In another example, the user computing entity 120, delivery vehicle 107, item 102, or carrier/transporter computing entity 100 may provide a communication through a wired or wireless network (e.g., an Internet protocol network and/or the like) to the service point device 117 indicating that an item is to be delivered to the service point and requesting an indication of whether or not an individual is available at the service point to receive the item. For example, the user computing entity 120, delivery vehicle 107, item 102, or carrier/transport computing entity 100 may provide a communication to the service point device 117 through an application program interface, through the Cloud, via a Wi-Fi network accessible at or in the vicinity of the service point (e.g., within at least a portion of the activation zone), through a Bluetooth signal, and/or the like. In one example embodiment, the service point device 117 may emit a regular signal (e.g., be a beacon). The user computing entity 120 or vehicle 107 may detect the signal emitted by the service point device 117 and determine based thereon that the delivery vehicle 107 is within the activation zone. The communication to the service point device 117 may be sent in response thereto, possibly through the Internet, the Cloud, through a manufacturer of the service point device data center, and/or the like. In yet another example, sensors 156 may identify motion in the field of view of an imaging device 158 of the service point device 117, causing the imaging device 158 to capture digital image data. The digital image data may be analyzed and the shape of the delivery vehicle 107 may be identified from the digital image data. The identifying of the shape of the delivery vehicle 107 within the digital image data may trigger the activation of the service point device 117, in an example embodiment. In another example embodiment, activation of the service point device 117 may trigger the analysis of the digital image data to determine if the shape of the delivery vehicle 107 is identifiable within the digital image data in order to authenticate the activation of the service point device 117.

In an example embodiment, the communication provided to the service point device 117 may be configured to identify the service point device 117. For example, if the communication is provided by short/long range communication technology, the communication may identify the service point device 117 by name. For example, the service point device 117 may be aware that it is affixed to a building having the address 1201 West Peachtree Street. The service point device 117 may then respond to the name 1201 West Peachtree Street, 1201 West Peachtree, 1201 W Peachtree, and/or the like. In another embodiment, the individual associated with the service point may name the service point device 117 (e.g., through a set up process for the service point device 117) and provide the carrier/transporter computing entity 100 with the assigned name (e.g., the assigned name may be stored in the customer profile associated with the service point, stored in item information/data corresponding to the item 102, and/or the like). In an example embodiment, the communication is provided through a wired or wireless network and identifies the service point device 117 by an internet protocol (IP) address or similar identifier. In some embodiments, the service point device 117 may not be identified in the activation request may be provided by a short/long range communication technology and be directed (e.g., transmitted in a directional manner) toward the service point device 117. In another example, the activation request may be provided to the service point device 117 located at service point (e.g., affixed to a building located at the service point) by a short/long range communication technology and based on proximity of the delivery vehicle 107, item 102, or user computing entity 120 to the service point device 117.

At block 510, a remote activation authentication may be performed. For example, the user computing entity 120, delivery vehicle 107, item 102, or carrier/transporter computing entity 100 may perform a remote activation authentication. For example, a code may be provided to the service point device 117 to authenticate that the remote activation is being performed by and/or on behalf of the carrier/transporter. In another example, a "handshake" may be performed between the service point device 117 and the user computing entity 120, delivery vehicle 107, item 102, or carrier/transporter computing entity 100 to authenticate that the remote activation is be performed by an authorized entity. Various other types of authentication may occur in example embodiments, to authenticate the remote activation of the service point device 117. In example embodiments, the authentication of the remote activation may be completed without action on the part of the delivery vehicle driver. In an example embodiment, the remote activation authentication may be performed by determining that at least two of the user computing entity 120, the delivery vehicle 107, and/or the item 102 are located at the location of (or within a predefined distance thereof) the service point device 117 and/or the service point location, for example as described in U.S. application Ser. No. 14/942,034, which is incorporated herein in its entirety by reference.

For example, in an example embodiment, activation of the service point device 117 may trigger the analysis of digital image data captured by the service point device 117 (e.g., the imaging device 158) to determine if the shape of the delivery vehicle 107 is identifiable within the digital image data in order to authenticate the remote activation of the service point device 117. In another example embodiment, the geolocation of the delivery vehicle 107, the user computing entity 120, and/or the item 102 may be determined and compared to the location of the service point device 117 to authenticate the remote activation of the service point device 117.

At block 512, it is determined if an individual is available to receive the item at the service point. For example, the user computing entity 120 may receive an indication of user input/interaction (or a lack of user input/interaction within a configurable time period) received by the interior interface 162, a customer computing entity 110, and/or other computing entity indicating that an individual is available to receive the item at the service point or is not available to receive the item at the service point. It may then be determined, based on the received indication, if a user is or is not available to receive the item at the service point.

If, at block 512, it is determined that an individual is available to receive the item at the service point, the delivery vehicle driver is notified that an individual is available to receive the item at the service point. For example, the user computing entity 120 may receive a delivery approval notification from the service point device 117 (e.g., via a short/long range communication and/or via a wired or wireless network, such as an Internet protocol network and/or the like) and, in response thereto, provide an availability notification (e.g., display a message, notification, alert, and/or the like; provide an audible notification; or, in the case of an automated delivery system, provide electronic instructions) indicating an individual is available to receive the item at the service point and the delivery vehicle driver should continue with the attempt to deliver the item at the service point.

For example, at block 514, the delivery vehicle driver may, after receiving the availability notification, stop/park the delivery vehicle in the vicinity of the service point, exit the delivery vehicle, retrieve the item from the delivery vehicle, approach the service point with the item, and/or the like. For example, after receiving the availability notification, the delivery vehicle driver may attempt to deliver the item to the service point. In some embodiments, after delivery of the item is completed, the user computing entity 120 may provide an item delivery notification to the service point device 117 or customer computing entity 110 indicating that the item has been delivered and/or providing information/data regarding the delivery of the item.

In an example embodiment, the geolocation of the customer computing entity 110 may be determined (e.g., by a location sensor thereof) and provided to the service point device 117. The service point device 117 may determine if the customer computing entity 110 is located at the location of the service point device 117 (e.g., inside or near a structure associated with the service point). In one embodiment, if the customer computing entity 110 is not located at the service point, the service point device 117 may provide an availability notification that the individual is not available, even if the individual indicated through the alert interface that they were available.

If, at block 512, it is determined that an individual is not available to receive the item at the service point, the delivery vehicle driver is notified that no individuals are expected to be available to receive the item at the service point. For example, the user computing entity 120 may provide a deferral notification (e.g., display a message, notification, alert, and/or the like; provide an audible notification; or, in the case of an automated delivery system, provide electronic instructions) indicating it is expected that no individuals are available to receive the item at the service point and the delivery vehicle driver should not attempt to deliver the item at the service point at this time. The delivery vehicle driver may, after receiving the deferral notification, may direct the delivery vehicle to the next service point (in the case where the delivery vehicle is not a self-driving vehicle). In some embodiments, in response to the deferral notification, the delivery driver may not exit the delivery vehicle and/or may not retrieve the item from the delivery vehicle. For example, the delivery vehicle driver may not exit the delivery vehicle and/or retrieve the item from the delivery vehicle until after being provided an availability notification indicating that an individual is available to receive the item at the service point. For example, the attempt to deliver the item to the service point may be deferred.

At block 516, an electronic information notice may be provided. For example, the user computing entity 120, delivery vehicle 107, item 102, or carrier/transporter computing entity 100 may provide an electronic information notice. In example embodiments, the electronic information notice may be provided to the service point device 117 and configured to be provided (e.g., displayed, provided in an audible form, and/or the like) to an individual by the interior interface 162 and/or a customer computing entity 110. In example embodiments, the electronic information notice may provide information/data regarding the deferred attempt to deliver the item to the service point (e.g., "An attempt to deliver an item at this location was attempted at 2:05 pm on Aug. 1, 2016. A signature is required for delivery of the item. The attempt was deferred because no one was available at the service point to receive the item."), information/data regarding how an individual (e.g., the consignee and/or an agent thereof) may schedule a delivery of the item, access to a web-based portal or user interface the individual may use to schedule a delivery of the item, information/data regarding where, how, and/or when the consignee may pick up the item at another location (e.g., a retail location, a manned or unmanned locker, and/or the like), and/or the like.

FIG. 7 provides a flowchart for a similar process as that shown in FIG. 6, but from the perspective of the service point device 117. Starting at block 552, a remote activation request is received. For example, the service point device 117 may receive a remote activation request. The remote activation request may be received via a short/long range communication technology and/or through a wired or wireless network (e.g., an Internet protocol network and/or the like). In an example embodiment, the remote activation request comprises a code or "name" that identifies the service point device 117. In another example embodiment, the remote activation request comprises a geolocation (e.g., of the user computing entity 120, delivery vehicle 107, or item 102) and the service point device 117 may determine that the geolocation is within a configurable radius or area about the location of the service point device 117 and the service point device 117 may process the remote activation request based thereon.

At block 554, the remote activation request may be authenticated. For example, the electronic service point device 117 may request an authentication code from the computing entity that provided the remote activation request or the service point device 117 may request an authentication of the remote activation request from the carrier/transporter computing entity 100. In another example, the service point device 117 may participate in an authentication "handshake" with the computing entity that provided the remote activation request.

At block 556, in response to the remote activation request and/or the authentication thereof, an electronic alert may be activated. For example, the service point device 117 may cause the interior interface 162 and/or one or more customer computing entities 110 to dynamically provide an electronic alert interface (e.g., a doorbell alert interface). For example, an electronic alert interface may be dynamically provided (e.g., displayed, provided in an audible manner) in response to the electronic alert being activated. In example embodiments, one or more customer computing entities 110 may be registered with the service point device 117 (or the service point device 117 may be registered with one or more customer computing entities 110) such that when the service point device 117 is activated, an alert is dynamically provided to the one or more registered customer computing entities 110. The alert is processed by the one or more customer computing entities 110 (e.g., in accordance with an application operating on the user computing entity 110) and causes an electronic alert interface to be provided (e.g., displayed) by a display of the user computing entity 110. In example embodiments, the electronic alert interface may indicate that a carrier/transporter would like to deliver an item to the service point and request the individual provide feedback in a configurable time period.

FIG. 8 provides an example alert interface 600 that may be dynamically provided (e.g., displayed) by the interior interface 162 and/or customer computing entity 110 in response to the service point device 117 receiving the remote activation request and/or the authentication thereof. The electronic alert interface 600 comprises proposed delivery information/data 602, a yes button 604, a no button 606, an electronic signature option button 608, and a time left to respond indicator 610. The proposed delivery information/data 602 may indicate that the carrier/transporter would like to delivery an item to the service point and provide an expected delivery time (e.g., the time remaining until it is expected that the delivery vehicle driver will be at the service point with the item) For example, the proposed delivery information/data may indicate that the delivery is expected to occur in (e.g., one minute, two minutes, an estimation of the time required before the delivery vehicle driver will be at the service point with the item). The proposed delivery information/data 602 may also indicate where the service point is (e.g., the address and/or a location at the address such as front door, leasing office, reception area, and/or the like). The electronic alert interface 600 may then provide the individual with a selectable option/indicator indicating that the individual will be available to take delivery of the item at the service point, such as yes button 604. The electronic alert interface 600 may further provide the individual with a selectable option/indicator indicating that the individual will not be available to take delivery of the item, such as no button 606. In some embodiments, the electronic alert interface 600 may provide the individual with the option of providing an electronic signature, such as electronic signature option button 608. The electronic signature option will be described in more detail elsewhere herein. The time left to respond indicator 610 may count down the time remaining for the individual to provide input responding to the electronic activation alert. For example, the individual may have a configurable period of time (e.g., two minutes, one minute, thirty seconds, twenty seconds, and/or the like) to respond to the electronic activation alert through the electronic alert interface 600. If the user input/interaction responding to the electronic activation alert (e.g., through the electronic alert interface 600) is not received before the expiration of the configurable period of time to respond, the lack of response may be interpreted as the individual not being available to receive the item. For example, responsive to not receiving a response from the electronic alert interface within a configurable time period, determining that the user is not available to receive the item at the service point. For example, not receiving a response through the electronic alert interface within the configurable time period may trigger automatic selection of the no button 606 (e.g., cause the process to continue as if the no button 606 had been selected). In example embodiments, the configurable period of time for responding to the electronic alert may be less than the expected delivery time, approximately the same as the expected delivery time, or longer than the expected delivery time, as appropriate for the application. In example embodiments, the electronic alert interface may be provided by audible means and the user response may be captured through voice recognition technology (e.g., the individual may say "yes" in response to an audible alert interface to indicate he/she is available to receive the item at the service point).

Returning to FIG. 7, at block 558, input information/data is received. For example, the service point device 117 may receive input information/data from the interior interface 162 and/or one or more customer computing entities 110 providing an indication of a user input/interaction (e.g., user selection of a button/key/indicator/icon/graphic/link (hard or soft), audible user input/interaction, and/or the like) or an indication that no user input/interaction was received within the configurable period of time. At block 560, it is determined if the input information/data indicates that an individual is available for receiving the item at the service point. For example, the service point device 117 may determine if the input information/data indicates that an individual is available for receiving the item at the service point. For example, the input information/data may indicate that an individual selected the yes button 604 using the interior interface 162, another individual selected the no button 606 using a customer computing entity 110, and another customer computing entity 110 did not receive a response within the configurable time period. Based on this example input information/data, the service point device 117 (e.g., the processor 150) may determine that an individual is available to receive the item at the service point. In an example embodiment, in response to a positive response (e.g., an individual selects the yes button 604, registers a "yes" through voice recognition technology, and/or the like) the service point device 117 may determine that an individual is available to receive the item at the service point and may not wait to receive any further input information/data before making the determination that an individual is available.

In an example embodiment, in response to receiving a positive response, the electronic activation alert may be cancelled or turned off. For example, the interior interface 162 and/or one or more customer computing entities 110 may stop providing the electronic alert interface and/or may indicate that a positive response has been received (e.g., a message may be displayed by one or more customer computing entities 110 and/or the interior interface 162 that says "Sue said she will accept delivery of the item." if the customer computing entity 110 registered as "Sue's Phone" receives the user input/interaction of selection of the yes button 604).

If, at block 560, it is determined that the input information/data indicates that an individual is available to receive the item at the service point (e.g., at the expected delivery time), the process continues to block 562. At block 562, a delivery approval notification is provided. For example, the service point device 117 may transmit and/or provide a delivery approval notification. For example, the service point device 117 may provide a delivery approval notification to the delivery vehicle 107, user computing entity 120, and/or the like. In example embodiments, the service point device 117 may provide the delivery approval notification by a short/long range communication and/or a wired or wireless network (e.g., an internet protocol network and/or the like). In an example embodiment, the user computing entity 120 may receive the delivery approval notification from the service point device 117 and may provide an availability notification to a delivery vehicle driver (e.g., may display a message, provide an audible indication, and/or the like) indicating that the delivery vehicle driver should attempt to deliver the item to the service point (e.g., in accordance with the expected delivery time).

In an example embodiment, in response to receiving the delivery approval notification or as part of authenticating the remote activation of the service point device 117, the geophysical location of the item 102 and the geophysical location of at least one of delivery vehicle 107 or the user computing entity 110 are co-located. For example, it may be determined (e.g., by the user computing entity or the carrier/transporter computing entity 100, that the geophysical location of the item 102 and the geophysical location of at least one of the delivery vehicle 107 or the user computing entity 110 are located within a first threshold distance of each other (e.g., 2 meters, 5 meters, and/or the like). After receiving an indication from the driver (e.g., operating the user computing entity 110) indicating that the item 102 has been delivered to the service point, the geophysical location of the item 102 may be determined. For example, it may be determined that the geophysical location of the item 102 is within a second threshold distance (e.g., 2 meters, 5 meters, 10 meters) of the location or geolocation of the service point device 117 and/or the location or geolocation of the service point (e.g., a smart device located at the service point or a known location of the service point). If the item 102 is within the second threshold distance of service point device 117 and/or the service point, the geolocation of at least one of the delivery vehicle 107 or the user computing entity 110 may be monitored to determine when the geolocation of the delivery vehicle 107 and/or the user computing entity 110 is greater than a third threshold distance (e.g., 10 meters, 20 meters, 100 meters, and/or the like) from the geolocation of at least one of the item 102, the service point device 117, and/or the service point. In response to determining that the distance between (a) the geolocation of the delivery vehicle 107 and/or the user computing entity 110 and (b) the geolocation of the item 102 and (i) the location or geolocation of the service point device 117 and/or (ii) the location or geolocation of the service point is greater than the third threshold distance, a delivery confirmation notification/indication may be generated and/or provided. For example, the carrier/transporter computing entity 100 may generate or receive and store the delivery confirmation notification/indication with the item information/data corresponding to the item 102. In an example embodiment, a delivery confirmation fortification/indication may be generated, provided, and/or received in response to determining that at least one of (a) the distance between the geolocation the item and the geolocation of at least one of (i) the delivery vehicle or (ii) the user computing entity is greater than a third threshold distance or (b) the distance between the geolocation of the item and the geolocation of at least one of (i) the service point device or (ii) the service point is less than a second threshold distance If, at block 560, it is determined that the input information/data indicates that no individuals are available to receive the item at the service point (e.g., in accordance with the expected delivery time), the process continues to block 564. At block 564, it is determined if the user input/interaction indicates that the individual would like to use the (near) real-time electronic signature option to remotely authorize the delivery of the item to the service point even though no one is available to receive the item at the service point. In this particular context, real-time or near real-time is used to indicate that the opportunity to provide the electronic signature may be provided as a real-time or near real-time response to the activation of the service point device 117. For example, the opportunity to provide the electronic signature (and/or to indicate that the customer would like to provide an electronic signature) may be provided to the customer (e.g., via the customer computing entity 110) within milliseconds or microseconds of the remote activation of the service point device 117 and/or delayed from such immediate presentation only and/or primarily by automated data processing or network transmission processes required to provide the opportunity to provide the electronic signature (and/or to indicate that the customer would like to provide an electronic signature). Thus, the electronic signature is provided in response to the activation of the service point device 117 and in a timely manner thereafter such that the delivery of the item may be efficiently provided without causing delay in the execution of the dispatch plan. If, at block 564, it is determined that the user input/interaction indicates that the individual would like to use the (near) real-time electronic signature option (e.g., user input/interaction selecting the provide electronic signature button 608 is received) the process may continue as described in the Delivering an Item Authorized by a (Near) Real-Time Electronic Signature section below.

If, at block 564, it is determined that the user input/interaction does not indicate that the individual would like to use the (near) real-time electronic signature option to (remotely) authorize the delivery of the item (e.g., user selection of the no button 606 was received or no user selection was received within the configurable time period), the process continues to block 566. At block 566, a delivery deferral request is provided. For example, the electronic service point device 117 may transmit and/or provide a delivery deferral request. For example, the service point device 117 may provide a delivery deferral request to the delivery vehicle 107, user computing entity 120, and/or the like. In example embodiments, the service point device 117 may provide the delivery deferral request by a short/long range communication, through a wired or wireless network (e.g., an Internet protocol network), and/or the like. In an example embodiment, the user computing entity 120 may receive the delivery deferral request from the service point device 117 and may provide an deferral notification to a delivery vehicle driver (e.g., may display a message, provide an audible indication, and/or the like) indicating that the delivery vehicle driver should defer the attempt to deliver the item and not attempt to deliver the item to the service point (e.g., in accordance with the expected delivery time).

At block 568, an electronic information notice is received. For example, the service point device 117 may receive an electronic information notice. In an example embodiment, the user computing entity 120 may provide the electronic information notice through a short/long range communication and/or through a wired or wireless network (e.g., an Internet protocol network), and/or the like. In example embodiments, the electronic information notice may provide information/data regarding the deferred attempt to deliver the item to the service point, information/data regarding how an individual (e.g., the consignee and/or an agent thereof) may schedule a delivery of the item, access to a web-based portal or user interface the individual may use to schedule a delivery of the item, information/data regarding where, how, and/or when the consignee may pick up the item at another location (e.g., a retail location, a manned or unmanned locker, and/or the like), and/or the like.

At block 570, the electronic information notice is provided to one or more individuals. For example, the service point device 117 may cause the interior interface 162 and/or the one or more customer computing entities 110 registered with the service point device 117 to provide (e.g., display) the electronic information notice. For example, the interior interface 162 and/or one or more customer computing entities 110 may provide the information/data regarding the deferred attempt to deliver the item to the service point, information/data regarding how an individual (e.g., the consignee and/or an agent thereof) may schedule a delivery of the item, information/data regarding where, how, and/or when the consignee may pick up the item at another location (e.g., a retail location, a manned or unmanned locker, and/or the like), and/or the like. For example, the interior interface 162 and/or one or more customer computing entities 120 may provide a delivery scheduling interface that an individual may use to schedule a delivery of the item at a time (and location) at which it is expected an individual will be available to receive the item.

Thus, example embodiments of the present invention allow for the real-time or near real-time determination of whether an individual is available to receive an item at a service point before the delivery vehicle driver exits the delivery vehicle to attempt the make the delivery, before the item is removed from the delivery vehicle for the attempted delivery, and/or the like. In some embodiments, the determination of whether an individual is available to receive an item at a service point may be made before the delivery vehicle parks in the vicinity of the service point to attempt the delivery. If no one is available to receive the item at the service point, the attempted delivery is deferred in an efficient manner that allows the delivery vehicle driver to efficiently continue with the dispatch plan or itinerary.

As noted above, in example embodiments, a real-time or near real-time determination of whether an individual is available to provide an item for pick up and/or whether an item has been placed at an accessible location at a service point. For example, the alert interface may ask the individual if they are available to provide the item or if the item has been placed at an accessible location at the service point. In another example, if a customer has placed an item at an accessible location at the service point, the customer may use the customer computing entity 110 and/or the interior interface 162 to indicate that the item has been placed at an accessible location at the service point. The customer may further indicate the location of the accessible location at the service point (e.g., at back door, on front porch, in garage, and/or the like). In some embodiments, the customer may further provide any information/data needed to access the accessible location (e.g., a gate code, a garage door code, and/or the like). In an example embodiment, the customer may provide permission through the customer computing entity 110 (e.g., the doorbell application operating thereon and/or the like) or the interior interface 162 for the garage door, for example, to be opened by the service point device 117 in response to the remote activation request and/or the authentication thereof. In another example embodiment, for example if the remote activation request is sent before the delivery vehicle arrives at the service point, a second request may be provided from the user computing entity 120 to the service point device 117 when the delivery vehicle arrives at the service point (e.g., when the delivery vehicle is put in park and/or the engine is turned off, when the location of the delivery vehicle is identified as being at the service location, when the delivery vehicle is expected to arrive at the service point in one minute or less, and/or the like). The service point device 117 may then open the garage door, for example, in response to receiving the second request. The service point device 117 may automatically close the garage door, for example, after a configurable and/or predefined amount of time. In some embodiments, the user computing entity 120 may provide a third request to the service point device 117 after the user computing entity 120 has logged the pick-up (or delivery) of the item. The service point device 117 may then cause the garage door to close (or lock a gate, and/or the like) in response to receiving the third request. Thus, it should be understood that remote activation of a service point device (e.g., service point device 117) may be used to facilitate efficient delivery and pick-up of items from a delivery location.

4. Delivering an Item Authorized by a (Near) Real-Time Electronic Signature

As described above, in various situations delivery of an item may need to be authorized by a signature of an individual receiving an item. For example, item information/data corresponding to the item may indicate that delivery of the item requires a signature from the individual receiving the item (e.g., the consignee to whom the item is to be delivered and/or an agent thereof). In another example, a service point may be associated with instructions that any item delivered to the item requires either the item to be received by an individual or authorization of the item to be delivered by a (near) real-time signature. In example embodiments of the present invention, a (near) real-time electronic signature may be used to authorize the delivery of an item to a service point, even if an individual is not present at the service point to receive and/or sign for the item.

FIG. 9 provides a flowchart illustrating various processes and procedures that may be used to authorize delivery of an item using an electronic signature. In general, the process of authorizing the delivery of an item using an electronic signature may be similar to that shown in FIGS. 6 and 7. For example, the service point device 117 may receive a remote activation (e.g., from a delivery vehicle 107, item 102, user computing entity 120, or carrier/transport computing entity 100) or an in-person activation (e.g., a delivery vehicle driver may press an electronic doorbell activation button on the electronic service point device 117). In some embodiments, the electronic activation may be authenticated. In response to the electronic activation and/or authentication thereof, an electronic activation alert may be provided to the interior interface 162 and/or one or more customer computing entities 110 registered with the service point device 117. In response to receiving the electronic activation alert, the interior interface 162 and/or the one or more customer computing entities 110 may dynamically provide (e.g., display, provide audibly, and/or the like) an electronic alert interface 600. The interior interface 162 and/or one or more customer computing entities 110 may receive user input/interaction indicating that an individual is not available to receive the item at the service point (e.g., in accordance with the expected delivery time). For example, the received user input/interaction may select the electronic signature option button 608, and/or the like, indicating that the individual is not available to receive the item at the service point (e.g., in accordance with the expected delivery time) but would like to authorize the delivery of the item using an electronic signature (e.g., a remote and/or (near) real-time electronic signature). The individual may then be provided with an opportunity to provide an electronic signature (e.g., through a text message, voice message, and/or the like). The service point device 117 may receive input information/data indicating the selection of the electronic signature option button 608 by the individual (e.g., operating the interior interface 162 or a customer computing entity 110). In some embodiments, the electronic signature option is provided after and/or in response to the individual (e.g., operating the interior interface 162 or a customer computing entity 110) selecting the no button 606.

Starting at block 702, an indication of selection of the electronic signature option is received. For example, the user computing entity 120, delivery vehicle 107, and/or carrier/transporter computing entity 100 may receive an indication that the electronic signature option has been selected. For example, the service point device 117 may provide an electronic signature option notification to the computing entity 120, delivery vehicle 107, and/or carrier/transporter computing entity 100 through a short/long range communication, a wired or wireless network (e.g., an Internet protocol network), and/or the like. In an example embodiment, the delivery vehicle driver may be provided with a visual or audible notification of the receipt of the indication of the selection of the electronic signature option. For example, the user computing entity 120 may provide (e.g., display, provide an audible signal) indicating that that the delivery of the item is to be authorized using a (near) real-time electronic signature. The delivery vehicle driver may then prepare to deliver the item. For example, the delivery vehicle driver may then park the delivery vehicle in the vicinity of the service point (if not already done), and prepare to deliver the item to the service point (e.g., exit the delivery vehicle, retrieve the item from the delivery vehicle, walk with the item to the service point, and/or the like).

At block 704, the (near) real-time electronic signature is received. For example, the user computing entity 120, delivery vehicle 107, or carrier/transporter computing entity 100 may receive the real-time or near real-time electronic signature. For example, the service point device 117 may receive the electronic signature (e.g., an SMS or MMS message, a text or video message provided through the electronic doorbell application, a video file or steam, and/or the like comprising the electronic signature) from the interior interface 162 and/or a customer computing entity 110 and provide the electronic signature to the user computing entity 120 through a short/long range communication, a wired or wireless network (e.g., an Internet protocol network), and/or the like. In example embodiments, the electronic signature may be provided in a SMS or MMS message, a text-based or video-based message that is provided through a dedicated doorbell application, a video file or stream, and/or the like. In example embodiments, the electronic signature may comprise the individuals name in a particular format (e.g., /John Doe/), an item delivery authorization code that matches an item delivery authorization code stored in the customer profile associated with the service point, an item delivery authorization code that matches an item delivery authorization code stored in association with the item information/data, the individual saying his/her name, a signature captured through a touch sensitive pad/display, an image that matches an image stored in association with the customer profile and/or the item information/data, an image of the individual that is then analyzed to determine that the individual in the image is the same individual as is in an image stored in association with the customer profile and/or the item information/data, and/or the like. In example embodiments, the (near) real-time electronic signature may be provided by an individual that is remotely located with respect to the service point.

In example embodiments, the electronic signature may be verified. For example, a customer profile may include a sample electronic signature. The sample electronic signature may be compared against the received real-time or near real-time electronic signature to determine if the two electronic signatures are a match. For example, the electronic signatures may be determined to match if they are exactly the same. In some embodiments, the electronic signatures may be determined to match if they are substantially the same. For example, in one embodiment, the electronic signatures /John A Doe/ and /John Doe/ may be determined to match. If the sample electronic signature and the real-time or near real-time electronic signature are provided through a touch screen, using a stylus, and/or the like, the hand-writing (e.g., pressure map profile of the stylus or finger) may be compared to determine if the electronic signatures were likely generated by the same person.

In various situations, item information/data corresponding to the item may indicate that delivery of the item requires the item to be received and/or signed for by someone at least 18 years old, someone at least 21 years old, and/or the like. For example, if the item is a case of wine, the item information/data may indicate that the item should be received by someone of legal age to purchase a case of wine (e.g., 21 or older). In such situations, the delivery vehicle driver may confirm the age of the individual authorizing the delivery of the item with the (near) real-time electronic signature, at block 706. For example, the individual (e.g., operating the interior interface 162 and/or a customer computing entity 110) may be asked to enter or provide his/her birthdate; acknowledge a statement wherein the individual agrees that he/she is at least of a particular age (e.g., 18, 21, and/or the like); provide an image of the individual's government issued photo identification that may be captured in (near) real-time; and/or confirm the individual's age in some other manner. In example embodiments, an indication of the authorizing individual's age may be received and it may then be confirmed (e.g., by the user computing entity 120, the carrier/transporter computing entity 100, and/or the like) that the individual is old enough to authorize the delivery of the item. In an example embodiment, the individual's age (or birthdate) may be stored in customer information by the carrier/transporter computing entity 100 such that the confirmation of the individual's age may be performed without the individual providing a birthdate, age, and/or the like at the time of the delivery.

At block 708, after receiving the (near) real-time signature and/or the confirmation of the authorizing individual's age (e.g., the age of the individual providing the (near) real-time electronic signature), or in response thereto, authorizing delivery of the item to the service point. For example, in response to receiving the (near) real-time signature and/or the confirmation of the authorizing individual's age, the user computing entity 120 may provide an authorization notification by displaying a message, providing an audible sound, or, in the instance of an automated delivery vehicle driver, an electronic instruction indicating that the delivery of the item to the service point has been authorized. The delivery vehicle driver may then deliver the item to the service point without an individual receiving the item.

Thus, example embodiments of the present invention allow for an individual to authorize (e.g., sign for) delivery of an item in (near) real-time without the individual being present at the service point. For example, the individual may be involved in a project in the kitchen and not be available to go to the front door at the expected delivery time or the individual may be remotely located with respect to the service point and authorize the delivery of the item to the service point in (near) real-time. Thus, embodiments of the present invention allow the delivery vehicle driver to complete deliveries that otherwise would have been unsuccessful.

5. Dynamic Route Planning Based on Interaction with Service Point Device(s)

According to example embodiments, a dispatch plan may be dynamically updated based at least in part on remote interactions with one or more service point devices 117, wherein each service point device is located at a service point of the dispatch plan. For example, the user computing entity 120 and/or carrier/transporter computing entity 100 may remotely communicate with a plurality of service point devices 117 and then, based on the communications (e.g., availability information/data received from the plurality of service point devices) and leveraging map information/data, the route for completing the dispatch plan for the delivery vehicle may be dynamically updated. Thus, based on communications with a plurality of service point devices 117, a route used to traverse a neighborhood or zone of a delivery route may be determined after the delivery vehicle arrives at the neighborhood or zone of the delivery route and/or as the delivery vehicle is approaching the neighborhood or zone of the delivery route.

FIG. 10 provides a flowchart illustrating processes and procedures that may be implemented in an example embodiment to dynamically update a dispatch plan based on remote interactions with one or more service point devices. Starting at block 1002, the user computing entity 120 may identify one or more (e.g., a plurality) of service point devices at which an item is to be delivered or picked up and that is associated with an service point device located at the service point. For example, the vehicle 107 may enter and/or be approaching a neighborhood or other geographically defined area having one or more service points that the vehicle 107 is to service, according to the dispatch plan. The one or more service points may be identified by the user computing entity 120, based on the dispatch plan.

At block 1004, at least one of the one or more service point devices 117 may be remotely activated. For example, a plurality of service point devices 117 located within the neighborhood or other geographically defined area and located at service points to be serviced by the vehicle 107, according to the dispatch plan, may be activated. For example, similar to the alert interface shown in FIG. 8, an alert interface may be provided to one or more individuals (e.g., through the interior interface 162 and/or one or more customer computing entities 110). The alert interface may ask the individual if the individual is available to accept delivery of an item or provide an item for pick up at the service point within the next five minutes, ten minutes, fifteen minutes, twenty minutes, half an hour, and/or the like. In an example embodiment, the alert interface may allow an individual to enter a custom time period at which they will be available. For example, a user may enter that they are not available in the next ten minutes, but they will be available after the next ten minutes. In another example, the user may indicate that they are only available for the next ten minutes and will not be available thereafter. The individual may then interact with the alert interface (e.g., through the interior interface 162 and/or customer computing entity 110) to provide input indicating the individual's availability to receive a delivery or provide an item for pick up at the service point. In some embodiments, if input indicating an individual's availability is not received within the configurable time period, it may be determined that the individual is not available.

At block 1006, availability information/data is received from the remotely activated service point devices 117. For example, the user computing entity 120 may receive availability information/data from the remotely activated service point devices 117. For example, in response to receiving input indicating the individual's availability (or determining that no input was received within the configurable time period), a service point device may provide availability information/data to the user computing entity 120.

At block 1008, map information/data may be accessed. For example, map information/data corresponding to the neighborhood or other geographically defined area where the plurality of service point devices 117 are located, may be accessed. For example, the user computing entity 120 may access map information/data.

At block 1010, a dispatch plan update may be determined based on the received availability information/data and the map information/data. For example, the user computing entity 120 may determine a dispatch plan update for providing service (e.g., item delivery or pick up) at one or more of the service points identified within the neighborhood or other geographically defined area. The dispatch plan update may be based on the received availability information/data and/or the map information/data. For example, the dispatch plan may be updated in real time and/or near real time based on the received availability information/data. For example, the dispatch plan may be updated as the vehicle 107 is approaching and/or servicing a neighborhood or other geographically defined area based on received availability information/data. For example, a route through the neighborhood or other geographically defined area may be determined and/or updated based on the availability information/data. For example, in an example embodiment, an individual associated with service point A may provide input indicating they are available for the next five minutes but not thereafter and an individual associated with service point B may provide input indicating that the user is not available within the next five minutes, but will be available five to twenty minutes from now. The dispatch plan update may route the vehicle 107 such that it is expected that the vehicle 107 will arrive at the service point A within the next five minutes and will arrive at service point B at least five minutes from now, but less than twenty minutes from now. Thus, a dispatch plan update may be determined based on the received availability information/data.

At block 1012, the dispatch plan update may be provided. For example, in response to determining and/or receiving the dispatch plan update, the user computing entity 120 may cause the user computing entity 120 to provide at least a portion of the dispatch plan update. For example, the user computing entity 120 may provide text, map, and/or audible turn by turn directions for executing the dispatch plan. The user computing entity 120 may therefore provide text, map, and/or audible turn by turn directions for the dispatch plan update, such that the item deliveries and pick ups may be performed in accordance with the dispatch plan update.

6. Monitoring of Item Delivered to Service Point without being Received

In example embodiments, an item 102 may be delivered to a service point having a service point device (e.g., service point device 117) located at the service point (e.g., affixed to a building or structure located at the service point, within a building or structure located at the service point, and/or the like). However, the item 102 may not be received by an individual at the time of delivery. For example, the item may be left on a front porch, by a back door, in or by a garage, and/or at another accessible location at the service point. In an example embodiment, a service point device 117 may be used to monitor the item 102 to ensure that the item is not removed from the service point by an unauthorized individual. In an example embodiment, the service point device 117 may be configured to receive scheduled communications from the item 102 (e.g., via a short/long range communication technology). If a scheduled communication is not received and/or a characteristic of the communication does not match expectations, an alert may be provided. For example, if the signal strength of a received scheduled communication is significantly different than a previously received communication, it may be determined that a characteristic of the communication does not match expectations. Some example characteristics of the communication may be signal strength, a location of the item 102 (e.g., geophysical coordinates) provided in the communication, the absence or change of the item 102 in an image captured by the imaging device 158, and/or the like.

FIG. 11 is a flowchart illustrating processes and procedures that may be used to monitor an item 102 that was delivered to a service point using a service point device (e.g., service point device 117). Starting at block 802, the delivery vehicle driver may place the item at the service point and establish a communication session between the item 102 and the service point device 117. In one example embodiment, the communication session between the item 102 and the service point device 117 may be established before the item 102 is removed from the delivery vehicle. For example, the user computing entity 120 may establish a communication session between the item 102 and the service point device 117. For example, the user computing entity 120 may provide a communication to the service point device 117 (e.g., via a short range communication technology, an Internet protocol network, and/or the like) indicating that the service point device 117 should search for a signal being provided by the item 102. In an example embodiment, the user computing entity 120 may provide the service point device 117 with a signature of the signal that may be provided by the item 102. For example, the item 102 may emit a signal comprising an item identifier or other particular code, at a particular frequency, and/or having some other particular characteristic. For example, the item 102 may be a beacon, have an RFID tag affixed thereto (or within the item 102), and/or the like. In an example embodiment, the user computing entity 120 may provide the service point device 117 with information regarding how frequently the service point device 117 should expect to receive a signal from the item 102 (e.g., every five seconds, every thirty seconds, once per minute, once every five minutes, once every ten minutes, once every half an hour, and/or the like). In example embodiments, the item 102 may provide a signal in response to receiving a communication from the service point device 117, rather than emitting a signal at a regular interval. In such embodiments, the user computing entity 120 may provide the service point device 117 with instructions for how frequently the service point device 117 should perform this call and response with the item 102. In some embodiments, the item 102 provides a signal and/or the service point device 117 and the item 102 to perform a call and response at a configurable, default frequency. In an example embodiment, an initiating communication may be received by the service point device 117 from the item 102 at the time of delivery to initiate the communication session and provide the service point device 117 with a baseline signal strength of the communication provided by the item 102 when the item 102 is at the service point.

At block 804, it is determined if an expected and/or scheduled communication from the item 102 is received. For example, the service point device 117 may determine if an expected and/or scheduled communication is received from the item 102.

If the expected and/or scheduled communication is received, it may be determined if a characteristic of the communication matches expectations for the characteristic of the communication, at block 806. The expectation of the characteristic of the communication may be based on an earlier communication and/or characteristic(s) thereof. For example, it may be determined if the received communication is of a similar signal strength to a previously received communication. For example, the service point device 117 may determine if the received communication is of a similar signal strength when compared to a previously received communication. For example, the service point device 117 may determine if the signal strength of the received communication varies by less than a signal change threshold when compared to the baseline signal strength, the signal strength of the immediately preceding communication, an average signal strength of the n preceding communications (e.g., the five communications immediately preceding the most recently received communication, and/or the like), and/or the like. In another example embodiment, the service point device 117 may determine if the signal strength of the received communication varies from one or more previously received communications in an expectable way. For example, if the signal provided by the item 102 is battery powered and the service point device 117 has been monitoring the item 102 for several hours, it may be expected that the signal strength of the communication provided by the item 102 may be slowly declining (e.g., declining at a particular rate, and/or the like).

If, at block 806, it is determined that the signal strength of the received communication is similar to one or more previously received signal strengths and/or varies from one or more previously received signal strengths in an expected way, the process may return to block 804 to determine if the next scheduled communication is received. For example, if it is determined that the signal strength of the received communication is in accordance with an expected signal strength based at least in part on at least one previously received communication, the process may return to block 804.

If it is determined at block 804 that the scheduled communication was not received and/or it was determined at block 806 that the signal strength of the received communication was different than expected, the process continues to block 808. At block 808, it is determined if a retrieval notification has been received. For example, the service point device 117 may determine if a retrieval notification has been received. For example, if an authorized individual (e.g., the consignee and/or an agent thereof) retrieves the item from the service point, the authorized individual may access a retrieval interface through the interior interface 162 and/or a customer computing entity 110 and provide user input/interaction indicating that the user retrieved the item 102 from the service point. In an example embodiment, block 808 may comprise causing display of a retrieval interface 850 (e.g., via the interior interface 162 and/or one or more customer computing entities 110) asking if the individual retrieved the item from the service point. For example, FIG. 12 provides an example retrieval interface 850. The retrieval interface 850 may comprise delivery information/data 852, a yes button 854, and a no button 856. For example, the delivery information/data 852 may provide the individual with the information/data identifying the service point to which the item 102 was delivered (e.g., an address and a particular location at the address). The individual may select the yes button 854 to indicate that an authorized individual retrieved the item 102 from the service point and provide a retrieval notification to the service point device 117. Similarly, the individual may select the no button 856 to indicate that an authorized individual did not retrieve the item 102 from the service point. If the individual selects the no button 856 and/or does not respond within a configurable retrieval time period (e.g., one minute, two minutes, five minutes, ten minutes, and/or the like), the interior interface 162 and/or the customer computing entity 110 may not provide a retrieval notification to the service point device 117.

If at block 808 it is determined that a retrieval notification has been received, the process ends and the service point device 117 is relieved from monitoring the item 102. If at block 808 it is determined that a retrieval notification has not been received, the process continues to block 810. At block 810, an alert is provided indicating that the item 102 has been moved and/or tampered with by a non-authorized individual. For example, the service point device 117 may provide an alert to the interior interface 162, one or more customer computing entities 110, and/or the carrier/transporter computing entity 100 indicating that the item 102 has likely been moved and/or tampered with by a non-authorized individual. In some embodiments, the service point device 117 may provide an audible and/or visual alert through the exterior interface 160, may turn on the imaging device 158 to capture one or more images and/or videos, and/or the like.

In example embodiments, a characteristic of the scheduled communication other than the signal strength of the communication may be used to determine if an item has been moved. For example, in some embodiments, the considered characteristic of the scheduled communication may be a geophysical location of the item (as indicated in the communication), image and/or video data of the item, the signal strength of the communication, and/or any combination thereof. In an embodiment, the scheduled communication from the item 102 may comprise geophysical coordinates (e.g., latitude and longitude) of the current location of the item 102. The service point device 117 may then determine if the most recently received geophysical coordinates indicate movement of the item 102 with respect to one or more previously received geophysical coordinates for the item 102. For example, it may be determined if the geophysical coordinates of the item 102 indicate that the item 102 has been moved from the service point. If the item 102 has been moved, an alert may be provided (e.g., to the carrier/transporter computing entity 100, the customer computing entity 110, through the internal interface 162, and/or the like).

In another example embodiment, the communication session may comprise the service point device 117 capturing digital image data and/or video data of the item 102. For example, the item 102 may be placed in a position where it is within the view of one or more imaging devices 158 of the service point device 117. The most recently captured digital image data and/or video data may be compared against previously captured digital image data and/or video data to determine if the item 102 has been moved or otherwise tampered with.

In example embodiments, it should be understood that a customer may initiate a communication session between a service point device 117 and an item 102 that is to be picked-up by the carrier. For example, the customer may place the item 102 at an accessible location at the service point and establish the communication session between the service point device and the item 102. When the pick-up of the item 102 occurs, the user computing entity 120 may provide a retrieval notification to the service point device 117. The customer (e.g., operating the interior interface 162, customer computing entity 110, and/or the like) may then be alerted that the carrier has picked-up the item 102.

Thus, example embodiments of the present invention allow a service point device (e.g., a service point device 117) to monitor an item to insure the item is retrieved by an authorized individual and to provide a (near) real-time alert if the item is moved and/or tampered with by a non-authorized individual. For example, the service point device may capture images that may comprise the non-authorized individual moving and/or tampering with the item and/or may sound an alarm that may cause the non-authorized individual to leave the item and leave the premises.

V. CONCLUSION

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:
   establishing a communication, by a service point device using a short range or long range communication technology, between an item located at a service point and the service point device, wherein (a) the service point device is located at the service point and is configured to communicate both through (i) the short range or long range communication technology and (ii) through an Internet protocol network, (b) there are a series of scheduled communications between the item and the service point device, and (c) the service point is a delivery location or a pick-up location of a dispatch plan;
   receiving, by the service point device, a communication of the series of scheduled communications provided by the item;
   determining, by the service point device, whether a characteristic of the communication is in accordance with an expected characteristic of the communication, based at least in part on at least one previous communication; and
   in response to determining that the characteristic of the communication is not in accordance with the expected characteristic, determining that the item has been moved.

2. The method of claim 1, wherein the characteristic of the communication is a signal strength of the communication, geophysical coordinates of the item provided by the communication, image or video data of the item, or any combination thereof.

3. The method of claim 1, further comprising, in response to determining that the item has been moved, providing an indication that that item has been moved.

4. The method of claim 1, wherein the change in the characteristic of the communication indicates that the item has been moved such that the item is no longer within communication range of the service point device using the short range or long range communication technology and not within the field of view of an imaging device of the service point device.

5. The method of claim 1, wherein the communication comprises the item sending a periodic communication to the service point device.

6. The method of claim 1, wherein the communication comprises a periodic call and response communication between the service point device and the item.

7. The method of claim 1, wherein the communication comprises the service point device capturing image and/or video data of the item.

8. The method of claim 1, wherein (a) the item was delivered to the service point location via a delivery vehicle or the item was placed at the service point location for pick up via a delivery vehicle and (b) the delivery vehicle is (i) an umanned terrestrial vehicle, (ii) an unmanned aerial vehicle, or (iii) a manned terrestrial vehicle.

9. An apparatus comprising at least one processor and at least one memory storing computer program code, the apparatus being configured to communicate both through (a) a short range or long range communication technology and (b) through an Internet protocol network, the apparatus being located at a service point, the service point being a delivery location or a pick-up location of a dispatch plan, and the at least one memory and the computer program code configured to, with the processor, cause the apparatus to at least:
establish a communication using the short range or long range communication technology, between an item located at the service point and the apparatus, wherein there are a series of scheduled communications between the item and the apparatus;
receive a communication of the series of scheduled communications provided by the item;
determine whether a characteristic of the communication is in accordance with an expected characteristic of the communication, based at least in part on at least one previous communication; and
in response to determining that the characteristic of the communication is not in accordance with the expected characteristic, determine that the item has been moved.

10. The apparatus of claim 9, wherein the characteristic of the communication is a signal strength of the communication, geophysical coordinates of the item provided by the communication, image or video data of the item, or any combination thereof.

11. The apparatus of claim 9, wherein the at least one memory and the computer program code are further configured to, with the processor, cause the apparatus to at least, in response to determining that the item has been moved, provide an indication that that item has been moved.

12. The apparatus of claim 9, wherein the change in the characteristic indicates that the item has been moved such that the item is no longer within communication range of the apparatus using the short range or long range communication technology and/or within the field of view of an imaging device of the apparatus.

13. The apparatus of claim 9, wherein the communication comprises the item sending a periodic communication to the apparatus.

14. The apparatus of claim 9, wherein the communication comprises a periodic call and response communication between the apparatus and the item.

15. The apparatus of claim 9, wherein the communication comprises the apparatus capturing image and/or video data of the item.

16. The apparatus of claim 9, wherein (a) the item was delivered to the service point location via a delivery vehicle or the item was placed at the service point location for pick up via a delivery vehicle and (b) the delivery vehicle is (i) an umanned terrestrial vehicle, (ii) an unmanned aerial vehicle, or (iii) a manned terrestrial vehicle.

17. A computer program product comprising at least one non-transitory computer-readable storage medium having computer-executable program code instructions stored therein, the computer-executable program code instructions comprising program code instructions configured to:
establish a communication, by a service point device using a short range or long range communication technology, between an item located at a service point and the service point device, wherein (a) the service point device is located at the service point and is configured to communicate both through (i) the short range or long range communication technology and (ii) through an Internet protocol network, (b) there are a series of scheduled communications between the item and the service point device, and (c) the service point is a delivery location or a pick-up location of a dispatch plan;
receive, by the service point device, a communication of the series of scheduled communications provided by the item;
determine, by the service point device, whether a characteristic of the communication is in accordance with an expected characteristic of the communication, based at least in part on at least one previous communication; and
in response to determining that the characteristic of the communication is not in accordance with the expected characteristic, determine that the item has been moved.

18. The computer program product of claim 17, wherein the characteristic of the communication is a signal strength of the communication, geophysical coordinates of the item provided by the communication, image or video data of the item, or any combination thereof.

19. The computer program product of claim 17, wherein the program code instructions are further configured to, in response to determining that the item has been moved, provide an indication that that item has been moved.

20. The computer program product of claim 17, wherein the change in characteristic indicates that the item has been moved such that the item is no longer within communication range of the service point device using the short range or long range communication technology and/or within the field of view of an imaging device of the service point device.

21. The computer program product of claim 17, wherein the communication comprises the item sending a periodic communication to the service point device.

22. The computer program product of claim 17, wherein the communication comprises a periodic call and response communication between the service point device and the item.

23. The computer program product of claim 17, wherein the communication comprises the service point device capturing image and/or video data of the item.

24. The computer program product of claim 17, wherein (a) the item was delivered to the service point location via a delivery vehicle or the item was placed at the service point location for pick up via a delivery vehicle and (b) the delivery vehicle is (i) an umanned terrestrial vehicle, (ii) an unmanned aerial vehicle, or (iii) a manned terrestrial vehicle.

* * * * *